United States Patent
Sikes et al.

(10) Patent No.: US 9,994,767 B2
(45) Date of Patent: Jun. 12, 2018

(54) AMINO ACID, CARBOHYDRATE AND ACRYLAMIDE POLYMERS USEFUL AS FLOCCULANTS IN AGRICULTURAL AND INDUSTRIAL SETTINGS

(75) Inventors: C. Steven Sikes, Eugene, OR (US); Mark A. Hochwalt, Chesterfield, MO (US); T. Daniel Sikes, Eugene, OR (US)

(73) Assignee: Aquero Company, LLC, Eugene, OR (US)

( * ) Notice: Subject to any disclaimer, the term of this patent is extended or adjusted under 35 U.S.C. 154(b) by 930 days.

(21) Appl. No.: 12/090,216

(22) PCT Filed: Oct. 12, 2006

(86) PCT No.: PCT/US2006/040168
§ 371 (c)(1),
(2), (4) Date: Oct. 2, 2008

(87) PCT Pub. No.: WO2007/047481
PCT Pub. Date: Apr. 26, 2007

(65) Prior Publication Data
US 2009/0127205 A1 May 21, 2009

Related U.S. Application Data

(63) Continuation-in-part of application No. 11/472,958, filed on Jun. 22, 2006, now Pat. No. 7,595,007, which
(Continued)

(51) Int. Cl.
*C02F 1/56* (2006.01)
*C09K 17/22* (2006.01)
(Continued)

(52) U.S. Cl.
CPC ............ *C09K 17/22* (2013.01); *C02F 1/56* (2013.01); *C08L 3/08* (2013.01); *C10G 1/047* (2013.01);
(Continued)

(58) Field of Classification Search
CPC ............ C02F 1/52; C02F 1/56; C02F 2103/10
(Continued)

(56) References Cited

U.S. PATENT DOCUMENTS 3,502,575 A * 3/1970 Hepp et al. ............... 210/705
3,541,009 A 11/1970 Arendt et al.
(Continued)

FOREIGN PATENT DOCUMENTS

CA 2204087 A1 11/1997
JP 2001-129310 A 5/2001
(Continued)

OTHER PUBLICATIONS

Orts, W.J., and Glenn G.M., Meeeting Abstract, "Use of Polymer Flocculating Agents to Control Agricultural Soil Loss", Book of Abstracts, 213th ACS National Meeting, San Francisco, Apr. 13-17, 1997.
(Continued)

*Primary Examiner* — Peter Keyworth
(74) *Attorney, Agent, or Firm* — MBM Intellectual Property Law LLP

(57) ABSTRACT

Modified polysaccharides, acrylamide copolymers, water-soluble amino acid copolymers, and combinations thereof are described for uses including flocculation of solids, particularly flocculation of soil in an agricultural settings and clarification of process waters from oil-sands mining operations. Also described are methods of preparing selected amino acid copolymers and modified polysaccharides.

13 Claims, 10 Drawing Sheets

Related U.S. Application Data is a continuation-in-part of application No. 11/473,004, filed on Jun. 22, 2006, now Pat. No. 7,595,002.

(60) Provisional application No. 60/726,721, filed on Oct. 14, 2005.

(51) Int. Cl.
| | | |
|---|---|---|
| C08L 3/08 | (2006.01) | |
| C10G 1/04 | (2006.01) | |
| C02F 101/32 | (2006.01) | |
| C02F 103/10 | (2006.01) | |

(52) U.S. Cl.
CPC ...... *C02F 2101/32* (2013.01); *C02F 2103/10* (2013.01)

(58) Field of Classification Search
USPC .......................................................... 210/708
See application file for complete search history.

(56) References Cited

U.S. PATENT DOCUMENTS

| | | | |
|---|---|---|---|
| 3,633,310 A | 1/1972 | Sandiford | |
| 3,705,467 A | 12/1972 | McKnight | |
| 3,775,311 A | 11/1973 | Mook et al. | |
| 3,873,487 A | 3/1975 | Minato et al. | |
| 3,875,054 A | 4/1975 | Hunt et al. | |
| 3,932,282 A | 1/1976 | Ettelt | |
| 3,981,100 A | 9/1976 | Weaver et al. | |
| 4,066,495 A | 1/1978 | Voigt et al. | |
| 4,071,447 A | 1/1978 | Ramirez | |
| 4,105,824 A | 8/1978 | Monte | |
| 4,120,815 A | 10/1978 | Raman | |
| 4,175,035 A | 11/1979 | Moyer, Jr. | |
| 4,214,987 A | 7/1980 | Clemens | |
| 4,237,004 A | 12/1980 | Helke | |
| 4,244,813 A | 1/1981 | Moyer, Jr. | |
| 4,330,407 A | 5/1982 | Shermer et al. | |
| 4,330,409 A * | 5/1982 | Yong et al. ................... 210/731 |
| 4,382,853 A * | 5/1983 | McCoy .......................... 208/188 |
| 4,405,015 A * | 9/1983 | McCoy et al. ................ 166/267 |
| 4,457,371 A | 7/1984 | Mccoy et al. | |
| 4,600,501 A * | 7/1986 | Poirier .......................... 208/188 |
| 4,673,511 A | 6/1987 | Richardson et al. | |
| 4,699,951 A | 10/1987 | Allenson et al. | |
| 4,705,825 A | 11/1987 | Symes et al. | |
| 4,738,784 A | 4/1988 | Sugihara | |
| 4,734,205 A | 5/1988 | Jacques et al. | |
| 4,741,835 A | 5/1988 | Jacques et al. | |
| 4,797,145 A | 1/1989 | Wallace et al. | |
| 5,128,046 A | 7/1992 | Marble et al. | |
| 5,178,774 A | 1/1993 | Payne et al. | |
| 5,330,656 A | 7/1994 | Hassick | |
| 5,408,029 A | 4/1995 | Wood | |
| 5,451,328 A * | 9/1995 | Bottero et al. ................ 210/724 |
| 5,593,947 A | 1/1997 | Kinnersley et al. | |
| 5,659,998 A | 8/1997 | Salestrom | |
| 5,693,222 A | 12/1997 | Galvan et al. | |
| 5,730,882 A | 3/1998 | Gallup et al. | |
| 5,861,356 A | 1/1999 | Koskan et al. | |
| 5,928,474 A | 7/1999 | Moffett | |
| 6,034,204 A | 3/2000 | Mohr et al. | |
| 6,042,732 A * | 3/2000 | Jankowski et al. ........... 210/727 |
| 6,048,438 A * | 4/2000 | Rosencrance et al. ....... 162/158 |
| 6,214,786 B1 | 4/2001 | Randall et al. | |
| 6,217,778 B1 | 4/2001 | Shing et al. | |
| 6,238,521 B1 | 5/2001 | Shing et al. | |
| 6,307,013 B1 | 10/2001 | Chivers | |
| 6,337,023 B1 | 1/2002 | Broussard et al. | |
| 6,620,317 B2 | 9/2003 | Alviti | |
| 6,699,363 B2 | 3/2004 | Moffett | |
| 6,803,107 B2 | 10/2004 | Mitchell et al. | |
| 6,825,313 B2 | 11/2004 | Sikes | |
| 6,884,347 B1 | 4/2005 | Krieger | |
| 6,889,471 B2 | 5/2005 | Arnold et al. | |
| 6,960,294 B2 | 11/2005 | Arnaud | |
| 6,969,750 B2 | 11/2005 | Tanaka et al. | |
| 7,077,201 B2 * | 7/2006 | Heins ............................ 166/266 |
| 7,160,470 B2 | 1/2007 | Davis et al. | |
| 7,183,336 B2 | 2/2007 | Berlin et al. | |
| 7,497,954 B2 | 3/2009 | Ivan et al. | |
| 7,595,002 B2 | 9/2009 | Sikes et al. | |
| 7,595,007 B2 * | 9/2009 | Sikes et al. .................... 252/180 |
| 7,987,297 B2 | 7/2011 | Schwabe et al. | |
| 2002/0058786 A1 | 5/2002 | Chivers | |
| 2002/0121484 A1 | 9/2002 | Arai et al. | |
| 2004/0007500 A1 * | 1/2004 | Kresnyak ............... C10G 33/00 208/187 |
| 2005/0194323 A1 * | 9/2005 | Ruth .................... B01D 17/00 210/723 |
| 2008/0058576 A1 | 3/2008 | Shafer et al. | |
| 2010/0038314 A1 | 2/2010 | Vion et al. | |
| 2010/0126926 A1 | 5/2010 | Wiemers | |
| 2010/0213405 A1 | 8/2010 | Wensloff | |
| 2011/0195844 A1 | 8/2011 | Bruchmann | |
| 2011/0272362 A1 | 11/2011 | Sikes et al. | |
| 2012/0282678 A1 | 11/2012 | Champagne | |
| 2014/0166586 A1 | 6/2014 | Sikes | |
| 2015/0259231 A1 | 9/2015 | Webber et al. | |

FOREIGN PATENT DOCUMENTS

| | | |
|---|---|---|
| JP | 2007-209890 A | 8/2007 |
| WO | WO 98/21271 | 5/1998 |
| WO | WO 05/054300 | 6/2005 |
| WO | WO 2007/047481 A2 | 4/2007 |
| WO | WO 2010/011867 A1 | 1/2010 |
| WO | WO 2012/148397 A1 | 11/2012 |
| WO | WO 2014/018452 A1 | 1/2014 |

OTHER PUBLICATIONS

Orts et al., ACS Symposium Series (2001), 786 (Biopolymers form Polysaccharides and Agroproteins), 102-116.
Lentz et al., *Soil Science Society of America Journal*, 56(6):p. 1926-1932 (1992).
Hart, "Chemical Removal of Organic Foulants from Produced Water Recycled as Steam" SPE International Thermal Operations and Heavy Oil Symposium and International Horizontal Well Technology Conference (2002).
Wang et al., "Effects of Chemical Application on Antifouling in Steam-Assisted Gravity Drainage Operations" Energy & Fuels, vol. 19, pp. 1425-1429 (2005).
American Society for Testing and Materials, Method D 7066-04, 2004.
Communication pursuant to Article 94(3) EPC issued in European Patent Application No. 06 825 932.4 dated Feb. 6, 2014.
Communication pursuant to Article 94(3) EPC issued in European Patent Application No. 06 825 932.4 dated Jul. 12, 2010.
Communication pursuant to Article 94(3) EPC issued in European Patent Application No. 06 825 932.4 dated Jun. 26, 2009.
Communication pursuant to Article 94(3) EPC issued in European Patent Application No. 06 825 932.4 dated Nov. 10, 2011.
Communication pursuant to Article 94(3) EPC issued in European Patent Application No. 09 790 780.2 dated Jun. 14, 2012.
Communication pursuant to Article 94(3) EPC issued in European Patent Application No. 09 790 780.2 dated Aug. 18, 2014.
Communication pursuant to Article 94(3) EPC issued in European Patent Application No. 11 172 873.9 dated Jul. 9, 2015.
Communication pursuant to Article 94(3) EPC issued in European Patent Application No. 11 172 873.9 dated Nov. 28, 2012.
Hans Burkert, Jürgen Hartmann: "Flocculants" In: Ullmann's Encyclopedia of Industrial Chemistry Jun. 2000, 14 pages.
International Preliminary Report on Patentability issued in International Patent Application No. PCT/US2009/051589 (WO 2010/011867)dated Jan. 23, 2011.
International Search Report issued in International Patent Application No. PCT/US2009/051589 (WO 2010/011867) dated Jan. 28, 2010.

(56) References Cited

OTHER PUBLICATIONS

International Search Report issued in International Patent Application No. PCT/US2011/034311 (WO 2012/148397)dated Nov. 1, 2012.
International Search Report issued in International Patent Application No. PCT/US2013/51507 (WO 2014/018452) dated Dec. 16, 2013.
Non-Final Office Action issued in U.S. Appl. No. 11/472,958 dated Jan. 9, 2009.
Non-Final Office Action issued in U.S. Appl. No. 11/473,004 dated Nov. 14, 2008.
Notice of Allowance issued in U.S. Appl. No. 11/473,004 dated Jun. 1, 2009.
Notice of Allowance issued in U.S. Appl. No. 44/472,958 dated Jun. 2, 2009.
Office Action issued in Canadian Patent Application No. 2,595,723 dated Apr. 14, 2008.
Office Action issued in Canadian Patent Application No. 2,643,137 dated Apr. 1, 2011.
Office Action issued in Canadian Patent Application No. 2,643,137 dated Feb. 28, 2012.
Office Action issued in Canadian Patent Application No. 2,643,137 dated Jun. 18, 2010.
Office Action issued in Canadian Patent Application No. 2,731,608 dated Jul. 13, 2015.
Patent Examination Report No. 1 issued in Australian Patent Application No. 2009273946 dated Jan. 28, 2015.
Restriction Requirement issued in U.S. Appl. No. 11/472,958 dated Oct. 23, 2008.
United States Environmental Protection Agency (EPA) Method 1664, Revision A, 1999. N-Hexane extractable material (HEM; oil and grease) and silica gel treated n-hexane extractable material (SGT-HEM; non-polar material) by extraction and gravimetry. Cincinnati, Ohio: U.S. EPA National Service Center for Environmental Publications, Doc. No. EPA-821-R-98-002, Feb. 1999, 23 pages.
United States Environmental Protection Agency (EPA) Method 9071A, Revision 1, 1994, Oil and grease extraction method for sludge and sediment samples. U.S. EPA, Sep. 1994, pp. 1-7.
Office Action dated Apr. 26, 2016 (CA 2,731,608).
Notice of Allowance dated Jul. 12, 2016 (CA 2,731,608).
Office Action dated Mar. 18, 2015 (US 2011/0272362).
Notice of Allowance dated Dec. 24, 2015 (US 2011/0272362).
Office Action dated Mar. 1, 2017 (2,834,496).
Restriction Requirement dated May 5, 2016 (US 2014/0166586).
Office Action dated Aug. 17, 2016 (US 2014/0166586).
Notice of Allowance dated May 12, 2017 (US 2014/0166586).
Office Action dated Jul. 3, 2017(US 2015/0259231).
Notice of Allowance dated Nov. 3, 2017 (US 2015/0259231).

\* cited by examiner ced carcinogen. Of course, effective steps are taken to
AMINO ACID, CARBOHYDRATE AND ACRYLAMIDE POLYMERS USEFUL AS FLOCCULANTS IN AGRICULTURAL AND INDUSTRIAL SETTINGS This application is a 35 U.S.C. § 371 National Stage Application of International Application No. PCT/US2006/040168, filed Oct. 12, 2006, designating the United States which is a continuation-in-part of U.S. patent application Ser. No. 11/472,958 filed on Jun. 22, 2006 which issued as U.S. Pat. No. 7,595,007 on Sep. 29, 2009, and a continuation-in-part of U.S. patent application Ser. No. 11/473,004 filed on Jun. 22, 2006 which issued as U.S. Pat. No. 7,595,002 on Sep. 29, 2009, all of which claim priority to U.S. Provisional Application No. 60/726,721 filed on Oct. 14, 2005, and all of which are hereby incorporated in their entirety by reference.

FIELD OF THE INVENTION

The present invention relates to copolymers, modified polymers, and combinations thereof having good water solubility and flocculation activity. In particular, the invention relates to amino acid copolymers, polysaccharides, and acrylamide polymers having such properties, used either alone or in combination.

BACKGROUND

Copolymers of acrylic acid and acrylamide (PAM) were introduced for improvement of soil quality via aggregation of soil particles over 50 years ago (U.S. Pat. Nos. 2,625,529 and 2,652,380 to Hedrick and Mowry (1953) and U.S. Pat. No. 2,652,381 to Basdekis (1953)). Commercial use of PAM in agriculture started to grow in the mid-90's and has gradually increased to levels of several million pounds per year of annual application in the U.S. In current use, the copolymers are generally dissolved in irrigation water at doses of 2 to 10 ppm, which converts to about 2 to 5 lbs per acre.

Principal benefits include soil retention and water conservation. Soil is retained on the fields via the agglomerating action of PAM as it flocculates soil constituents into larger, adhering particles that settle out of the flow. Hence, the water runs clear rather than turbid down the furrow. Moreover, because the fine powders and platelets of the soil become agglomerated as part of the settled particles, the natural porosity of the soil along the furrow does not become clogged with these fines as occurs in untreated furrows, and the infiltration of water into the soil is improved. Thus, water is conserved on the field, rather than flowing over and off the field, carrying topsoil with it. Ancillary benefits include reduced loss of adsorbed nutrients, fertilizers, and treatment chemicals such as herbicides and pesticides from the soil. These benefits lead to overall improvements in yields and crop quality.

On the other hand, there are problems with the ongoing usage of PAM in agriculture. For example, the polymers are generally very high MW (e.g. 12 to 22 million Da), which makes them slow to dissolve in water and produces very high viscosity solutions. Preparation of aqueous solutions requires vigorous stirring for extended periods to prevent the formation of viscous, gelatinous clumps, which remain insoluble and tend to clog metering equipment and delivery systems. Handling issues of this nature have significantly hindered the adoption of PAM by many growers.

In addition, the base monomer, acrylamide, is a hazardous, reactive monomer that is a known neurotoxin and suspected carcinogen. Of course, effective steps are taken to ensure that residual levels of monomer in the polymer products are well within safety limits. Nonetheless, it is evident that there are several properties and features of the copolymers of acrylate and acrylamide that are not desirable. Consequently, alternative materials are sought that will function well in agglomerating soil particles, without the handling issues and perceived environmental problems associated with PAM.

Other flocculation technologies for which environmentally friendly agents are sought include control of dust emissions into the atmosphere from particulate surfaces, in locations such as rural roads, construction sites, temporary landing pads and strips, and outdoor arenas and facilities. Currently used dust control agents have also been based on copolymers of acrylate and acrylamides, as well as other vinyl monomers that are derived from feedstocks of natural gas and petrochemicals (see e.g. U.S. Pat. Nos. 4,801,635, 5,514,412, and 5,242,248). Similar materials are used for the very high volume commodity markets for water treatment, including industrial and municipal water treatment (U.S. Pat. No. 5,178,774), treatment of process waters during mining operations (U.S. Pat. Nos. 4,253,970, 4,839,060, and 6,042,732), and treatment of municipal sewage and agricultural wastes for clarification and removal of suspended solids (U.S. Pat. No. 5,776,350).

A particular area in which improved flocculants are sought is in the area of oil-sands mining and processing. In this process, as described further below, roughly three barrels of oily and bituminous-containing process water are produced per barrel of oil. This process water is eventually recycled into the steam generators, but it must first be clarified and separate from substantial amounts of suspended and emulsified oil and bitumen. Because of the high oily and bituminous content of the process waters, ranging roughly from 1% to 60% solids, and the elevated temperatures involved (95° C. or higher), it has been challenging to design effective water-treatment protocols that clarify the water and provide good separation of the aqueous and petrochemical phases. Current practice for clarification of oil-sands process water typically employs high levels (thousands of ppm or more) of inorganic salts and/or polycationic agents, and take several hours, yet still often result in incomplete separation. Improved methods and compositions for clarifying such process waters are therefore desired.

SUMMARY

The compositions disclosed herein include amino acid copolymers, particularly copolymers of aspartate, asparagine, and/or succinimide, which may be crosslinked; polysaccharides, particularly starches and modified starches; acrylamide polymers such as acrylamide/acrylate copolymers; and polycationic polymers. These polymers, and particularly combinations thereof, as described herein, have good flocculation properties and are useful, for example, as soil retention and water conservation agents during irrigation in agriculture; for settling of suspended solids in water, such as in settling ponds and sumps on farms, or in process waters from mining operations; and in dust control, for example on roads, landing strips and pads, and at construction sites; among other uses. In some cases, the compositions may be modified to produce dispersant, rather than flocculent, activity.

The amino acid polymers, which can be produced from polysuccinimide, have defined ratios of aspartate, asparagine, and/or succinimide, along with crosslinking agents in some cases. Also disclosed are various methods of production of these copolymeric materials, as well as the starting polysuccinimides.

The modified carbohydrate polymers are made from natural polysaccharides, including starches and cellulosics. Modifications include conversion to a partially soluble, activated form; attachment of monomeric substituents; and grafting of amino acid copolymers.

Consequently, it is useful that in the present invention, inexpensive biological materials made from natural carbohydrates, amino acids, and their polymers are presented as flocculants, with particular utility as soil-retention and water-conservation agents. Moreover, formulations are identified in which marked synergisms were observed between the biological polymers and the current commercial standard flocculants, the copolymers of acrylate and acrylamide. This discovery enables use of highly effective and economic formulations that include both the biological polymers and the vinyl copolymers, these latter at much lower dosing, if so desired. The formulations of the present invention also exhibit improvements in handling, due to decreased viscosity and tendency to gel as compared to traditional copolymer flocculants of acrylate and acrylamide.

The disclosed processes for clarification of oil-sands process waters also require much lower levels of active agents than currently used methods, while providing improved speed and efficiency of clarification.

OVERVIEW OF PREFERRED EMBODIMENTS

In one aspect, the invention provides a method of producing flocculation in a soil/water mixture, by applying to, or including in, the soil/water mixture, a composition comprising an activated starch and an acrylamide polymer. The composition generally contains these components in a ratio between 0.1:1 and 100:1, preferably between 5:1 and 30:1, more preferably between 5:1 and 10:1. The amount of the composition is preferably about 0.2-300 ppm relative to said water in said soil/water mixture. Typically, amounts of about 0.35-100, preferably 0.5-50, more preferably 0.75-30 ppm, relative to water in the soil/water mixture, are used. Levels of 1-10 ppm are generally found to be effective.

For example, the flocculating composition may be added to an aqueous soil-containing suspension, preferably to obtain a concentration in the above ranges, relative to water in the suspension. As another example, (water in) a soil furrow may be irrigated using water containing the flocculating composition, preferably in the above ranges of concentrations. In the latter case, it can be seen that the soil/water mixture is subjected to conditions of fluid flow, as in furrow irrigation of soil, or pressure from droplet impact and the resulting turbulence, in spray irrigation of soil. In preferred embodiments of the invention, flocculation is effective under these conditions, resulting in improved soil retention and/or water infiltration during irrigation. The compositions can also be used for flocculation of municipal waste water or industrial waste water.

The acrylamide polymer is preferably an acrylamide/acrylate copolymer, having about 50-95 mole %, preferably 70-90 mole %, and more preferably around 80 mole % acrylamide residues. The molecular weight of the copolymer is preferably about 5 to 30 million, more preferably 12 to 25 million, and most preferably 15 to 22 million Daltons.

The activated starch may be prepared by heating an aqueous suspension of starch for up to about 2 hours, preferably 0.5-2 hours, at a temperature between 70° and 100° C., depending on the type of starch used. For potato starch, preferred temperatures are about 70-80° C., especially 70-75° C.; for wheat starch or corn starch, preferred temperatures are between about 85° and 100° C., especially 90° to 95° C. The suspension preferably contains about 5-10 weight % or less of the starch in water. Preferably, the pH of the suspension is ≤7, e.g. about 6-7.

Alternatively, a starch suspension or slurry may be activated by rapid heating, such as exposure to steam for brief intervals, e.g. about 10 seconds to 10 minutes, typically about 1-4 minutes, e.g. about 2-3 minutes (jet cooking). Again, higher temperatures are typically used for wheat and corn starches, as described further below.

The flocculant compositions may be prepared by combining the activated starch suspension, after heating as described above, with an aqueous solution of the acrylamide polymer. Alternatively, the acrylamide polymer may be included in the suspension of native starch as the latter is activated in a manner described herein.

The combined weight % of starch and acrylamide polymer in the final composition is typically about 0.1 to 50%, preferably 0.1 to 25%, more preferably 0.5 to 15%, and most preferably 1% to 10%. In selected embodiments, the combined weight % of starch and acrylamide polymer is about 2 to 5%.

As described further herein, inorganic salts may be added to reduce viscosity, particular for more concentrated formulations. Preferably, a preservative, such as a biocidal or biostatic agent, is added to inhibit microbial growth or degradation of the starch.

The compositions may be prepared in a solid or semisolid form by removing a majority of the water from an aqueous suspension of starch and/or acrylamide polymer, prepared by one of the methods described herein. In one embodiment, this is conveniently done by heating at about 80° C. The water may also be removed by other methods, such as spray-drying, freeze-drying, or solvent extraction. Preferably, temperatures >80° C. are avoided. Further to this aspect, the invention provides dry blends of activated starch, prepared by one of the activation methods described herein and subsequently dried, and acrylamide polymers, such as PAM. Such blends may be added to soil directly, followed by addition of water; or, more typically, they can be reformulated in water prior to use.

In one aspect of the invention, the activated starch compositions are employed alone, without the acrylamide polymer, or with small amounts of the acrylamide polymer, and are effective to improve water infiltration in soil during irrigation. Levels of amounts of about 0.2-50, more preferably 0.3-30 ppm, in irrigation water can be used. Levels of 1-10 ppm are generally found to be effective. In further embodiments, levels of 3-10 or 5-10 ppm are used.

In a related aspect, the invention provides a method of flocculating suspended or emulsified particles in a mixture comprising such particles and water, by applying to or including in such a mixture, a composition comprising a maleamate-modified polysaccharide, preferably a maleamate-modified starch, as described herein. Specifically, the maleamate-modified starch comprises groups of the form —CH(COO$^-$M$^+$)CH$_2$C(O)NH$_2$, linked to the starch via ether linkages, where M$^+$ represents hydrogen or a positive counterion.

The composition generally contains these components in a ratio between 1:1 and 100:1, preferably between 2:1 and 20:1. The amount of the composition is preferably about 0.2-300 ppm relative to said water in the treated mixture. Typically, amounts of about 0.3-100, preferably 0.4-50, more preferably 0.5-30 ppm, relative to water, are used. In further embodiments, levels of 1-25 or 5-10 ppm are used.

The mixture may be a soil/water mixture, as described for other flocculating starch/polymer compositions above. Alternatively, the mixture could comprise municipal waste water or industrial waste water. They are particularly useful for mixtures subjected to conditions of fluid flow or turbulence, e.g. for irrigation of soil in agricultural settings, and are effective to enhance soil retention under conditions of such flow and/or pressure, as well as to enhance water infiltration into the soil.

In one embodiment, the composition further comprises an acrylamide polymer, as described above, preferably copoly (acrylamide/acrylate) or PAM. Such compositions are typically effective as flocculants, soil retention agents, dust control agents, etc., at amounts about 25-50% less than required for activated starch/acrylamide polymer compositions in which the starch is not maleamate-modified.

The composition may also be a ternary composition, further containing activated starch, as described above. Such compositions are typically effective as flocculants, soil retention agents, dust control agents, etc., at amounts about 50% less than required for activated starch/acrylamide polymer compositions without maleamate-derivatized starch. The maleamate-modified starch and activated starch are each typically present at a level about 2-10 times, more typically about 5-10 times, that of the acrylamide polymer, by weight.

These compositions can be prepared as aqueous suspensions, e.g. by combining a suspension of activated starch with the maleamate-modified starch and the acrylamide polymer, in an aqueous medium. They may also be prepared in solid or semisolid (i.e. dried) form, as described for the starch/acrylamide polymer compositions above, and either applied in dried from or reconstituted prior to use.

Also provided is a method for preparing a polysaccharide modified with a group selected from maleamate and maleate, by treating the polysaccharide in water, at a basic pH, with a maleamate salt and/or a maleate salt, effective to produce a polysaccharide comprising groups of the form —CH(COO$^-$M$^+$)CH$_2$C(O)Z, linked to the polysaccharide via ether linkages, where M$^+$ represents hydrogen or a positive counterion, and Z represents NH$_2$ or O$^-$M$^+$.

Accordingly, the invention further provides a modified polysaccharide comprising groups of the form —CH(COO$^-$M$^+$)CH$_2$C(O)Z, linked to the polysaccharide via ether linkages, where M$^+$ represents hydrogen or a positive counterion, and Z represents NH$_2$ or O$^-$M$^+$. In one embodiment, the salt is a maleamate salt, such that Z represents NH$_2$. In another embodiment, the salt is a maleate salt, such that Z represents O$^-$M$^+$. The two may also be used in combination.

The polysaccharide is preferably a starch, e.g. potato, wheat or corn starch, but may also be selected from other polysaccharides such as agar, carrageenan, chitosan, carboxymethyl cellulose, guar gum, hydroxyethyl cellulose, gum Arabic, pectin, and xanthan gum.

The method may also be adapted to modify such polysaccharides with other groups, via Michael addition of hydroxyl groups of the polysaccharide to a molecule having a conjugated double bond. Preferably, the conjugated double bond is flanked by two conjugating groups selected from carbon-carbon and carbon-oxygen double bonds, where at least one is a carbon-oxygen double bond. Alternatively, the molecule includes a fatty alcohol component, e.g. a fatty alkyl or alkenyl acrylate (where "fatty alkyl or alkenyl" refers to a saturated or unsaturated, respectively, acyclic hydrocarbon radical which is preferably linear and contains six to about 24 carbon atoms; examples are stearyl and oleyl).

It is found that the maleate-modified starches are useful as dispersants, scale inhibitors, and chelators. Accordingly, the invention further provides a method of promoting dispersion of suspended or emulsified particles in a mixture comprising said particles and water, said method comprising: applying to, or including in, said mixture, a composition comprising a maleate-modified polysaccharide, preferably a maleate-modified starch. The maleate-modified starch comprises groups of the form —CH(COO$^-$M$^+$)CH$_2$COO$^-$M$^+$, as described above, linked to the starch via ether linkages, where M$^+$ represents hydrogen or a positive counterion.

In another aspect, further pertaining to preparation of flocculating compositions, a method is provided for preparing a crosslinked aspartate/asparagine copolymer, by adding a crosslinker, preferably selected from polyols and polyamines, to an aqueous solution of a water soluble aspartate/asparagine copolymer. The resulting solution is dried, e.g. at about 60-80° C. for several hours, and the residue is heated, preferably at about 170-180° C. for about 3 hours, under vacuum or in an inert atmosphere.

The molar ratio of monomeric residues in the starting copolymer (including both Asp and Asn) to crosslinker is in the range of about 1:1 to 100:1; in selected embodiments, from 4:1 to about 35:1 or from 2:1 to about 35:1. Preferably, higher levels of crosslinker are employed for lower MW copolymers, and vice versa. The crosslinker is preferably selected from diols, triols, and diamines; more particularly from C2-C8 alkanediols, C3-C8 alkanetriols, C2-C8 alkanediamines, and lysine. Exemplary crosslinkers include α,ω-diamines such as ethylenediamine and hexamethylenediamine. Also included are polymeric crosslinkers such as polylysine, typically of low molecular weights (1 to 10 kDa), although molecular weights up to about 70 kDa have been used.

The aspartate/asparagine copolymer to be crosslinked preferably has a residue ratio of aspartate/asparagine of about 1:3 to 1:10; in one embodiment, the copolymer is about 80 mol % asparagine. Its molecular weight is preferably about 600 to 300,000 Daltons, more preferably about 5,000 to about 50,000 Daltons.

Exemplary crosslinked copolymers include: a crosslinked aspartate/asparagine copolymer having a molecular weight of about 600 to about 300,000 Daltons, preferably 5 to 50 KDa, and a residue ratio of aspartate to asparagine (including crosslinked residues) of about 1:1 to 1:10 or less, e.g. about 1:4, which is crosslinked with a crosslinker selected from a diol, a triol, and a diamine. In selected embodiments, the crosslinker is selected from C2-C8 alkanediols, C3-C8 alkanetriols, C2-C8 alkanediamines, lysine, and polylysine; preferably, the crosslinked is selected from 1,6-hexanediamine, ethylenediamine, and lysine. In other selected embodiments, the molecular weight of the copolymer is about 30 KDa, the crosslinker is selected from C2-C8 alkanediols, C3-C8 alkanetriols, C2-C8 alkanediamines, and lysine, and the molar ratio of monomeric residues in the copolymer to crosslinker is in the range of about 2:1 to 100:1, preferably 15:1 to 40:1. Preferably, the crosslinker is 1,6-hexanediamine.

The crosslinked aspartate/asparagine copolymer may also be prepared directly from polysuccinimide. An aspartate/asparagine copolymer having high mole % asparagine is prepared by combining, at a temperature of about −20° to 5° C., a mixture of polysuccinimide in water with $NH_4OH$ and a crosslinker as described above, stirring the resulting mixture until substantially all solids are dissolved, and drying the resulting solution, e.g. at about 60-80° C. for several hours. The $NH_4OH$ is typically added in a molar excess of twofold or more. The polysuccinimide and copolymers thereof, e.g. aspartate/succinimide or aspartate/asparagine copolymers, may be prepared by methods known in the art and/or by methods disclosed herein.

The crosslinked copolymers as described above may be used, as shown herein, for flocculating suspended or emulsified particles in a mixture comprising such particles and water, by applying the crosslinked copolymers to, or including them in, such as mixture. The mixture may be a soil/water mixture, e.g. in agricultural uses such as soil retention and water infiltration. The crosslinked copolymer may be used in combination with other flocculating materials described herein, including activated starch, maleamate-modified starch, and/or an acrylamide polymer.

These compositions can be prepared as aqueous suspensions, e.g. by combining a suspension of activated starch with the further component(s) in an aqueous medium. They may also be prepared in solid or semisolid (i.e. dried) form, as described for the starch/acrylamide polymer compositions above, and either applied in dried from or reconstituted prior to use.

As discussed above, the agents disclosed herein are useful, alone or preferably in the combinations particularly described, for flocculation, soil retention, and water infiltration agents. Although agricultural applications are particularly contemplated, they may also be used, for example, in processing of waste waters from municipal and industrial sources. One particular embodiment involves treatment of process water generated in mining operations. Adding a flocculating composition as disclosed herein, preferably comprising an activated starch and/or a maleamate-modified starch in combination with an acrylamide/acrylate copolymer, and/or a crosslinked copolymer as described herein, is effective to flocculate emulsified or suspended materials in such process waters.

The emulsified or suspended materials may include minerals or hydrocarbon residues; the latter are especially prevalent in waste water from mining oil sands. In a method of clarifying hydrocarbon- and bitumen-containing process water obtained from an oil-sands mining operation, a composition comprising an acrylamide copolymer is added to the process water. The acrylamide copolymer is an anionic acrylamide copolymer, such as an acrylamide/acrylate copolymer, or, in a preferred embodiment, a cationic acrylamide copolymer ("cationic PAM"), such as an acrylamide/allyl trialkyl ammonium copolymer or an acrylamide/diallyl dialkyl ammonium copolymer. Exemplary copolymers include an acrylamide/allyl triethyl ammonium copolymer or acrylamide/diallyl dimethyl ammonium copolymer. In each case, the mole % acrylamide is at least about 50%, preferably at least 70%, and more preferably about 80-90%. The molecular weight of the acrylamide copolymer is at least 1 million Daltons, and preferably at least 4 million Daltons.

Preferably, the flocculant composition further includes an activated or maleamate-modified starch, preferably an activated starch; i.e. a heat activated starch as described herein. These components may be present in a ratio of activated starch:acrylamide copolymer of about 0.1:1 to 100:1, e.g. about 0.5:1 to 10:1.

In a further preferred embodiment, a polycationic coagulant is also added to the process water, together with or, more preferably, prior to addition of the acrylamide copolymer and/or activated starch. In this embodiment, the acrylamide copolymer is preferably a cationic acrylamide copolymer. An exemplary polycationic coagulant is polyEPI/DMA (a copolymer of epichlorohydrin and dimethylamine). Other coagulants include polymers of cationic monomers such as, for example, ammonium alkyl (meth)acrylamides, ammonium alkyl (meth)acrylates, diallyl dialkylammonium salts, allyl trialkyl ammonium salts, and amino acids such as lysine or ornithine. The mole percent of the cationic monomer is at least 50%, and other monomers, if present, are neutral monomers, e.g. acrylamide. The molecular weight of the polycationic coagulant is preferably at least 5000, and may be up to 100,000 or more, but is typically less than 1 million Daltons.

Preferably and advantageously, the process water is acidified prior to addition of the polymeric agents, e.g. to a pH of about 2 to 4.

In general, the total amount of active additives used in the process is in the range of 2 to 500 ppm, preferably 2 to 100 ppm, more preferably 2 to 75 ppm. In a preferred method, employing pH adjustment, a polycationic coagulant, and a starch/cationic PAM flocculant, as described above, the total amount of active additives is preferably in the range of about 2 ppm to about 60 ppm relative to the process water. When the starch is not included, an amount in the range of about 5 ppm to about 100 ppm relative to said process water is typically employed; and when no pH adjustment is done, an amount of 5 ppm to about 500 ppm relative to said process water is typically employed.

The coagulant and flocculant may be used in approximately equal amounts. Alternatively, they may be used in a ratio of up to about 2/1 flocculant to coagulant, or vice versa. Other ratios may also be used as effective.

The invention thus provides a clarification process for oil- and bitumen-containing process waters from oil-sands mining, preferably comprising the steps of:

(a) adjusting the pH of the process water to about 2-4;

(b) adding a polycationic coagulant, preferably polyEPI/DMA, to the process water; and (c) adding a flocculant composition, comprising a high MW cationic acrylamide copolymer, preferably an acrylamide/allyl triethyl ammonium copolymer or acrylamide/diallyl dimethyl ammonium copolymer, and an activated starch, to the process water. The acrylamide copolymer has a mole % acrylamide of at least 50% and a molecular weight of at least 1 million Daltons; the polycationic coagulant has a mole % cationic monomer of at least 50% and a molecular weight of at most 1 million Daltons.

The process preferably allows a flocculated layer of oily and/or bituminous material to be removed from the top surface of a clarified layer of the process water.

In a typical process, the process water is initially at a temperature of 85° C. or higher, and it contains 1-60 weight percent bitumen and other hydrocarbons. The process is thus effective on process waters having >20%, >30%, >40%, and >50% by weight bitumen and other hydrocarbons, as is typical of downstream waste waters from oil-sands mining processes.

A related process for clarifying hydrocarbon- and bitumen-containing process water obtained from an oil-sands mining operation includes the steps of
(a) adjusting the pH of the process water to about 2-4; and
(b) adding a polycationic coagulant, such as described herein, to the process water. The amount of polycationic coagulant, preferably polyEPI/DMA, added is preferably about 10 ppm to about 100 ppm relative to the process water. This process is less efficient than processes including the flocculant composition described above but can still be effective in clarifying process waters.

In a related aspect, the invention provides a composition for use in clarifying hydrocarbon- and bitumen-containing process water obtained from an oil-sands mining operation. The composition consists essentially of (i) polyEPI/DMA and (ii) a cationic acrylamide copolymer, preferably an acrylamide/allyl trialkyl ammonium copolymer or an acrylamide/diallyl dialkyl ammonium copolymer. The cationic copolymer has a molecular weight of at least 1 million and contains at least 50 mole % acrylamide; preferably, the molecular weight is at least 4 million, and mole % acrylamide is 80-90%.

A further composition for use in clarifying hydrocarbon- and bitumen-containing process water obtained from an oil-sands mining operation comprises (i) polyEPI/DMA, (ii) a cationic acrylamide copolymer as described above, and (iii) an activated starch, such as described herein.

Another useful application of the flocculating agents disclosed herein, used alone or in the combinations particularly described, is in the area of dust control. Accordingly, a flocculating composition as disclosed herein, preferably comprising an activated starch and/or a maleamate-modified starch in combination with an acrylamide/acrylate copolymer, and/or a crosslinked copolymer as described herein, is applied to a particulate surface, such as a road, preferably in combination with water. Various polysaccharides, in addition to starch, are found to be useful for this purpose, including agar, carrageenan, chitosan, carboxymethyl cellulose, guar gum, hydroxyethyl cellulose, gum Arabic, pectin, and xanthan gum.

Also disclosed herein are various methods of preparing polysuccinimides and amino acid copolymers, which can be used, as described above, in preparing flocculating compositions.

For example, a method is provided that is effective to prepare polysuccinimides having molecular weights up to about 300,000. In this method, polyphosphoric acid is mixed with water, and aspartic acid is added to the mixture to form a slurry, in an amount such that the phosphoric acid is present at 0.5 to 100% by weight of the aspartic acid. In one embodiment, the volume of water mixed with the polyphosphoric acid is approximately equal to the volume of the aspartic acid when dry. The slurry is allowed to sit at ambient temperature for up to an hour and is then dried, e.g. by heating at about 80-150° C., or via spray drying, forced air, vacuum, or solvent extraction. (For drying and/or concentration of aqueous reagent mixtures as described herein, any suitable oven, drier, evaporator, spray-drier, distillation, solvent-extraction or other method of removal of water can generally be used in this step of concentrating and drying. The drying step may be accomplished by any method known in the art, e.g. simple heating by convection, mild heating by forced air, spray drying, freeze drying, and others.) The dried material then is heated to polymerize, at about 150-240° C., preferably 180-220° C., under vacuum or in an inert atmosphere such as a nitrogen stream, typically for about 4 hours.

Accordingly, the method can be used to provide a polysuccinimide polymer having a molecular weight of at least 200 kDa, preferably at least 250 kDa, and having a substantially linear morphology.

Also provided are methods for preparing low molecular weight aspartate/succinimide copolymers, preferably having a high mole percentage of succinimide residues. In one method, a solution of sodium aspartate and ammonium aspartate in water, preferably at a molar ratio of about 1:10, more preferably about 1:3, is acidified, preferably to a pH of 3 to 5.5. The solution is then dried, e.g. by heating at about 120° C.; and the residue is heated at 160-220° C. for about 1 to 8 hours under vacuum or in an inert atmosphere.

This copolymer can then be converted, if desired, to a low molecular weight aspartate/asparagine copolymer, by treating with aqueous $NH_4OH$ and drying the solution, preferably at about 60° C. Finally, a low molecular weight Asp/Asn/succinimide terpolymer can be produced by acidifying an aqueous solution of the aspartate/asparagine copolymer, e.g. to about pH 4, drying the solution, preferably at about 60° C.-80° C., and heating the residue at about 170-180° C. under vacuum or an inert atmosphere.

In another method for preparing a low MW aspartate/succinimide copolymer, $NH_4OH$ and a water soluble alkali or alkaline earth salt, such as, for example, $MgSO_4$, NaCl, $Na_2SO_4$, $CaCl_2$, etc., are added to an aqueous solution of aspartic acid; the resulting solution is dried as described above, and the residue is polymerized by heating at about 160-240° C., preferably 180-220° C., for about 1 to 8 hours under vacuum or in an inert atmospheres. The molar ratio of the added salt to $NH_4OH$ can vary from about 1:100 to 100:1, depending on the desired aspartate/succinimide ratio in the product copolymer.

As above, the aspartate/succinimide copolymer can be converted to an aspartate/asparagine copolymer, by ring opening with aqueous $NH_4OH$, followed by drying under non-hydrolytic conditions at about 80° C. This copolymer can in turn be converted to an aspartate/asparagine/succinimide terpolymer, by acidifying an aqueous solution of the copolymer, to about pH 3 to 5.5; drying the solution under non-hydrolytic conditions at about 60-80° C.; and heating the residue at about 170-180° C., under vacuum or in an inert atmosphere, for about 1-3 hours.

Such terpolymers are useful for grafting to starch or other polysaccharides, to produce flocculants as described herein. This can be accomplished by combining a suspension of starch, preferably activated as described above, with the terpolymer, adjusting the pH to about 9-12, allowing the solution to react for up to about 3 hours, and neutralizing the solution with acid.

BRIEF DESCRIPTION OF THE DRAWINGS

FIG. 2B also includes treatment with 10 ppm activated starch alone. In the PL treatments, the water infiltrated to significantly greater depths significantly faster than did control and PAM treatments, as shown.

DETAILED DESCRIPTION

I. Definitions

Figure 1:
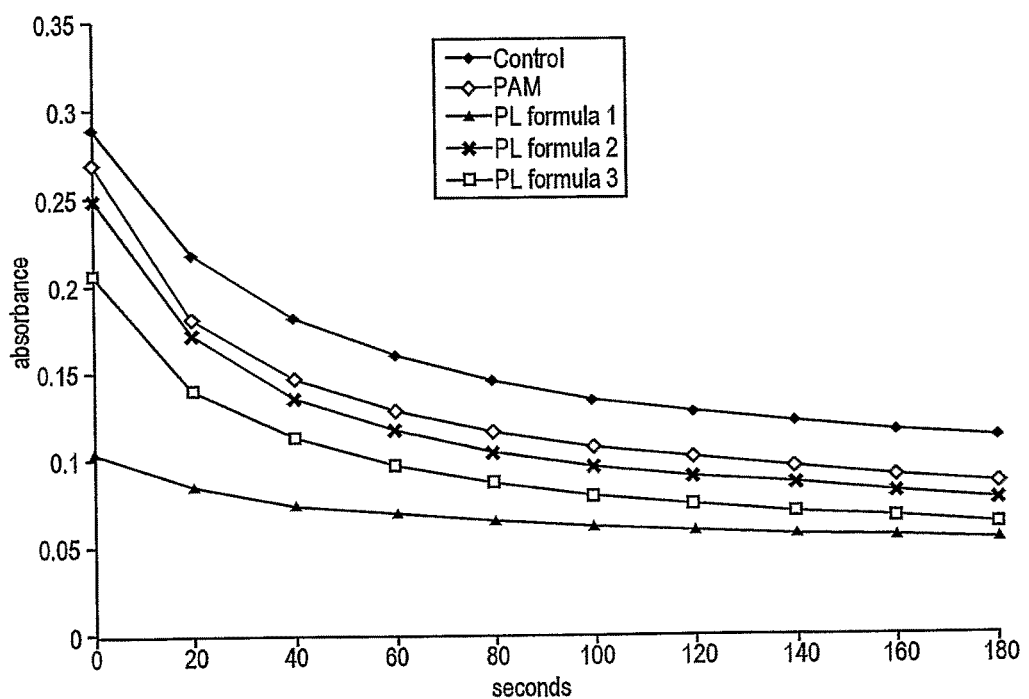
FIG. 1. Soil-cuvette assay representative results, carried out as described in Example 26b. Control treatments contain 25 mg soil in 10 ml 0.1 M $CaCl_2$, no additive. All other treatments contain equivalent doses (0.667 ppm) of copoly (acrylic, acrylamide) (PAM), which is just sufficient to provide a small benefit in rate of settling of soil particles. The "PL" treatments, in an embodiment of the invention, further include 3.33 ppm activated starch, a dose that by itself has no beneficial effect on settling of the soil particles. Hence, the results demonstrate the synergism between PAM and the activated starch. (The different PL preparations contain different preservatives, as described in Section V.A below.)

The terms below, as used herein, have the following definitions, unless indicated otherwise:

"Molecular weight" of a polymer refers to weight average molecular weight as determined by gel permeation chromatography (GPC), preferably using commercially available polymers e.g. polyaspartate, polyacrylate, copoly(acrylate/acrylamide), or polysaccharides, such as dextrans, as standards.

"Substantially linear" with reference to a polymer backbone indicates that the backbone has at most one branch point per six monomer residues, preferably at most one per 12 residues, and more preferably at most one per 20 residues, on a random basis.

"Water soluble" indicates that a polymer is greater than 95%, and preferably greater than 99%, soluble in water at room temperature.

An "aspartate residue", as used herein, includes backbone residues of the form —CH(COOR)—$CH_2$—(C═O)—NH— or —CH($CH_2$COOR)—(C═O)—NH— (β and α forms, respectively), where R is hydrogen, a cationic counterion, or, in derivatized copolymers, a substituent. The term thus includes aspartic acid residues as well as metal or ammonium aspartate residues.

An "asparagine residue", as used herein, includes backbone residues of the form —CH(CON$H_2$)—$CH_2$—(C═O)—NH— or —CH($CH_2$CON$H_2$)—(C═O)—NH— (β and α forms, respectively).

The term "polymer" encompasses homopolymers, copolymers, terpolymers, etc. The term "copolymer" refers to a polymer having more than one type of monomer residue. The term "terpolymer" refers to a polymer having at least three, and typically exactly three, types of monomer residue.

An "aspartate/succinimide copolymer", as defined herein, contains residues of aspartate and succinimide, and may further contain 50 mole % or less, preferably 10 mole % or less, of other monomer residues. Similarly, an "aspartate/asparagine copolymer", as defined herein, contains residues of aspartate and asparagine, and may further contain 50 mole % or less, preferably 10 mole % or less, other monomer residues. Similarly, an "aspartate/asparagine/succinimide terpolymer", as defined herein, contains residues of aspartate, asparagine, and succinimide. Such polymers may further contain 50 mole % or less, preferably 10 mole % or less, other monomer residues. In selected embodiments, these respective copolymer types contain only the named monomer residues. (The aspartate residues may contain a positive counterion, such as sodium or ammonium, or be protonated, depending on pH)

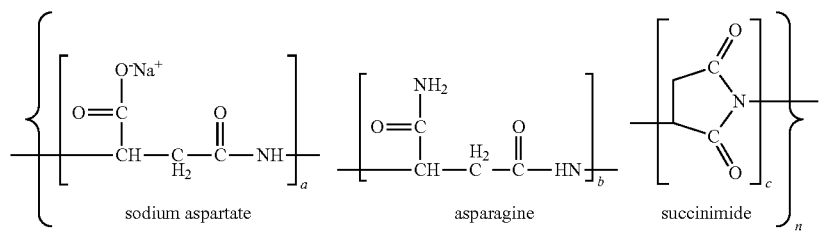

Terpolymer of Aspartate, Asparagine, and Succinimide

An "acrylamide polymer" or "acrylamide copolymer" refers to a polymer containing acrylamide monomer residues, preferably at a molar ratio greater than 50%, more preferably at a molar ratio greater than 75%. Examples include acrylamide homopolymer (polyacrylamide) or copoly(acrylate/acrylamide). Unless otherwise indicated, "PAM" refers to copoly(acrylate/acrylamide), preferably having these two monomers in a ratio of 1:3 to 1:5, preferably about 1:4. A "cationic PAM" is a copolymer of acrylamide with a cationic monomer.

"Starch" refers generally to a carbohydrate polymer stored by plants; common examples are potato, corn, wheat and rice starch. It is in fact a mixture(s) of two polymers: amylose, a linear (1,4)-α-D-glucan, and amylopectin, a branched D-glucan with primarily α-D-(1,4) and about 4% α-D-(1,6) linkages. Native (unmodified) starch is essentially insoluble in water at room temperature.

The phrase "activated starch" refers to a partially solubilized form of starch prepared by heating starch in water, e.g. in a suspension or spray, preferably at a temperature less than 100° C., e.g. 70-95° C., as described further below. Such activation typically provides flocculation activity not observed in the native (non-activated) starch. The term also encompasses commercially available pregelatinized starches, especially ColdSwell™ starches provided by KMC (Denmark).

A "soil/water mixture" refers to an aqueous liquid having suspended solids, as found in agriculture, mining, and sewage treatment operations. In one embodiment, the term refers to irrigated soil in agriculture, including furrow irrigation (where water is flowed over the soil) or spray irrigation (where water impacts the soil from above). Agricultural settling ponds are also included. In another embodiment, the term refers to waste waters from mining operations. In the soil/water mixture, either the solid (soil) or the liquid may be present in excess.

The term "alkyl" refers to saturated hydrocarbon radicals up to about 8 carbons in length, and preferably refers to lower alkyl, i.e. C1 to C6, more preferably C1 to C4. Specific embodiments include methyl, ethyl and propyl (n-propyl or isopropyl). In particular embodiments, alkyl is methyl or ethyl.

II. Modifications of Starch and Other Polysaccharides

The starch-based materials described herein are excellent flocculants, with good initial activity and increased activity with time, thus providing a form of controlled-release activity. They perform very well as compared to PAM in static flocculation assays. Under conditions of turbulence or fluid flow, they significantly improve the performance of reduced amounts of PAM as soil retention agents, as described further below. In addition, they significantly enhance water infiltration during irrigation, where PAM alone has little or no apparent benefit.

A. Thermal Activation

Native starch, e.g. potato starch, corn starch, or wheat starch, is not water-soluble and does not exhibit activity as a flocculent. However, it can be modified via an aqueous thermal treatment that renders it partially water-soluble and partially gelled, with some portion generally remaining insoluble. Any starch may be used; however, potato starch is preferred with respect to (its) greater ease of solvation and lower activation temperature in comparison to other starches, such as corn starch and wheat starch. Alternatively, use of other starches such as corn or wheat starch, which are significantly less costly than potato starch, is preferred in cases in which cost is the overriding concern.

Commercially available pregelatinized starch products, in particular ColdSwell™ starch as provided by KMC (Denmark), may also be used. Other commercially available cold water soluble starches that are useful in the formulations and methods disclosed herein include Mira Sperse® 629 corn starch (Tate & Lyle, Decatur Ill.), NSight™ FG-1 corn starch (Alco Chemical, Chattanooga, Tenn.), and Pregel™ 46 wheat starch (Midwest Grain Products, Atchison, Kans.).

In a typical activation procedure, such as described in Example 12a, potato starch is slurried in water at room temperature, preferably at a concentration of about 2 to 4% by weight. The slurry is heated, with vigorous stirring, to about 60-80° C., preferably about 70-80° C., and more preferably 70-75° C., for up to 2 hours, preferably 0.5 to 2 hours. Activation is generally carried out at near-neutral pH, e.g. about 6-7, preferably at slightly acidic pH, e.g. about 6.3 to 6.8. The optimal temperature of activation generally depends on the type of starch being used. For example, in the case of potato starch, as described above, activation begins at approximately 60° C., and inactivation occurs at approximately 85° C. In the case of corn or wheat starch, activation requires heating to 85 to 95° C., and inactivation occurs if the material is boiled. These latter types of starches are preferred in applications which may involve exposure to higher temperatures, since they are generally more heat stable than potato starch.

Starch may also be activated via rapid heating, e.g. using steam for brief intervals, as described in Example 12b. Accordingly, the composition is exposed to steam for about 10 seconds to 10 minutes, typically 1-4 minutes, more typically 2-3 minutes. Again, higher temperatures are generally employed for activation of corn and wheat starch than for potato starch.

Upon activation, the starch becomes partially solubilized and partially gelled, with some residual micron-sized particulates (visible via light microscopy or atomic force microscopy). Starch activated in this manner is an effective flocculant in itself, particularly in fluids held under relatively static conditions. In combination with other flocculating materials, such as acrylamide polymers or amino acid polymers (e.g. copoly(asp/asn)), as described below, it forms synergistic compositions which are effective in stabilizing particles, such as soil, under fluid flow. For example, the soil retention activity of such a combination is significantly greater than that of either component alone.

In addition, the activated starches exhibit increased flocculation activity with time. In some cases, for example, the flocculation activity is minimal when the material is first added to a soil suspension, but becomes quite pronounced over a period of several days or more. For example, as described in Example 12a below, the initial activity of an activated starch at 30 µg/ml was roughly equivalent to that of a commercial PAM at 10 µg/ml, but after a few days incubation of soil suspension plus additive, the activated starch, even at the lower doses (e.g. 5-10 µg/ml), outperformed this level of PAM. This activity often persisted for several months before beginning to fade. Without being bound to a particular mechanism of action, this effect could be due to slow solubilization of the gelled phase, and later any insoluble, ungelled globules of the activated starch, in the presence of water, releasing more molecules of the flocculating form of the starch. This feature would add a level of sustained release to flocculation and soil retention compositions. Accordingly, the activated starch-containing flocculants can become increasingly more effective over time after they are released into a fluid stream, e.g. during the time course of an irrigation or subsequent irrigations. The activity of the products, alone (and/)or in combination with other polymers, as flocculants, soil retention agents, water infiltration agents, and dust control agents is described further below.

Multicomponent flocculant compositions, containing, for example, activated starch and an acrylamide copolymer, may be prepared by combining an activated starch suspension, either commercially provided or heat activated as described above, with an aqueous solution of acrylamide polymer.

Alternatively, the acrylamide polymer may be included in the suspension of starch as the latter is activated in a manner described herein. For example, the composition may be prepared by first dispersing the starch in water at a temperature below the gelling temperature of the starch, then adding the acrylamide polymer, with vigorous stirring, to quickly disperse the polymer before it begins to gel. Preferably, acrylamide copolymer is added to an aqueous starch dispersion as a continuous stream of dry, granular material with vigorous stirring over an interval of 2 seconds to 5 minutes, preferably 10 seconds to 1 minute, most preferably 15-40 seconds. The resulting suspension is then heated in a manner described above, e.g. by conventional heating or by jet cooking, to activate the starch while the acrylamide polymer dissolves. See Example 12B below for a representative process.

B. Chemical Derivatization

Derivatization of polysaccharides, such as starch, with maleamic acid is found to enhance flocculant activity. Such derivatization of starch produces a modified starch having pendant secondary amide groups of maleamide. It is believed that the grafted maleamide groups improve flocculation activity by increasing water solubility while retaining or even increasing hydrogen bonding. Other polysaccharides that may be similarly derivatized include, for example, agar, carrageenan, chitosan, carboxymethyl cellulose, guar gum, hydroxyethyl cellulose, gum Arabic, pectin, and xanthan gum.

In one embodiment, starch is derivatized via a Michael addition between the hydroxyl groups of the glucose residues of starch and the double bond of maleamic acid, forming a carbon-to-oxygen (ether) covalent bond. In a typical procedure, a suspension of potato starch at 2 to 4% by weight in water is reacted with an amount of maleamic acid to provide 1 mole of maleamic acid per mole of glucose residue.

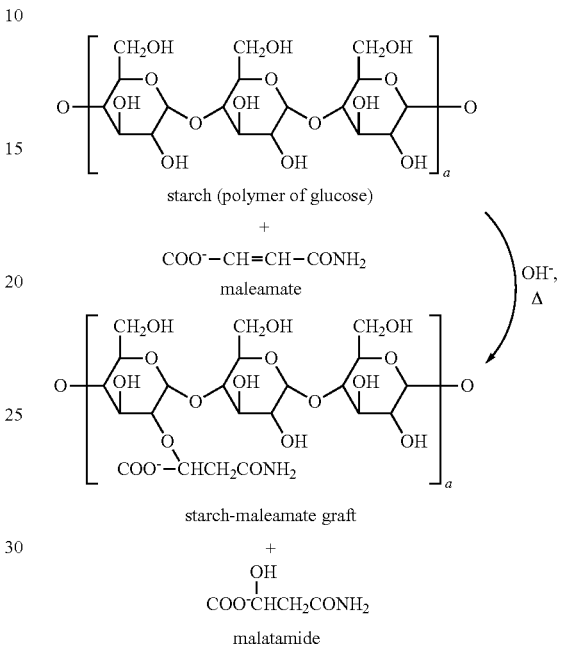

Effective reaction(s) conditions are basic pH, e.g. 9-13, preferably about 12-13, at about 60-125° C., preferably 70-95° C., for about 0.5-3 hours, preferably about 1 hour. A pressure reactor may be used. It is also useful to react higher residue ratios of maleamic acid to glucose, for example up to 3:1, under more alkaline conditions, for example up to pH 13. An exemplary procedure is described in Example 14.

The starch-maleamate grafts so produced were very good flocculants that also could be formulated with amino acid or acrylamide copolymers, as well as with ungrafted activated starch, to produce excellent soil-retention agents. For example, the product of Example 14, assessed by the soil vial and soil rill assays described in Examples 26-27, were excellent flocculants in the former, with increasing activity over the range of 5, 10, and 30 µg/ml of soil suspension. In addition, flocculation activity increased remarkably with time, showing results superior to PAM after a few days during which the soil suspension plus additive was incubated. This activity persisted for several months before beginning to fade. The maleamate-modified starches were less effective as soil retention agents, as evaluated in the soil rill assay described below, than as flocculants in static systems, but they outperformed activated underivatized starch in this respect.

Activated starch may also be derivatized with maleate, in a similar process using maleic anhydride or acid, as described in Example 15. These compositions exhibit marked dispersive activity rather than flocculation activity, and thus can be used as dispersants, chelators, scale control agents, etc.

The method may also be adapted to modify such polysaccharides with other groups, via Michael addition of hydroxyl groups of the polysaccharide to a molecule having a conjugated double bond. Preferably, the conjugated double bond is flanked by two conjugating groups selected from carbon-carbon and carbon-oxygen double bonds, where at least one is a carbon-oxygen double bond. Alternatively, the molecule includes a fatty alcohol component, e.g. a fatty alkyl or alkenyl acrylate.

III. Formulations of Polysaccharides with Acrylamide Co-Polymers or Amino Acid Co-Polymers The activated and/or modified polysaccharides described above can be combined with other flocculating polymers to form synergistic combinations; that is, where the activity of the combination is significantly improved over the expected additive effect from the components alone. For example, soil retention properties of small amounts of copoly(acrylamide/acrylate) (PAM) are significantly improved by addition of amounts of activated starch which, when used alone, show little activity in this area. Activated starch/PAM combinations also showed significant improvements in water infiltration, where PAM alone has no apparent effect.

A. Compositions with Acrylamide Polymers

Formulations containing activated and/or modified starch as described herein, in combination with copolymers of acrylate and acrylamide, are employed for flocculation, extending to improved soil retention, water infiltration, dust control, and clarification of oil sands process waters, as discussed in Section VI below. In this latter application, cationic copolymers may be preferred. In preferred anionic PAM polymers, as generally employed in the agricultural processes described herein, the molar ratio of acrylate/acrylamide is about 1:4; molecular weights are in the range of 12 million Da and higher, e.g. 18 to 22 million DA; and the polymers are predominantly linear. Such polymers are readily available from commercial sources. Commercially available anionic PAM copolymers that are useful in the formulations and methods disclosed herein include, for example, Superfloc® A836 and A-110 (Cytec, West Paterson, N.J.), Flowpam™ AN 923 SH and AN 910 SH (SNF Inc., Riceboro, Ga.), and Soilfix® IR (Ciba, Tarrytown, N.Y.). Each of these products has a molecular weight of at least 12 million Daltons and at least 80 mole % acrylamide.

It is found that the levels of copoly(acrylate/acrylamide) required for effective flocculation and soil retention are substantially reduced when combined with modified starches as described herein, even when the amount of modified starch added, used in isolation, provides relatively small or even negligible benefits. This reduction in the amount of PAM employed results in improved economics and better environmental and health profiles.

For example, combinations of activated starch:PAM in ratios ranging from 10:0.3 to 10:5 were prepared as described in Example 16. These formulations were assessed for flocculation activity via the soil vial, soil cuvette, and soil rill assays described in Examples 26-27. In addition, field assessments in both furrow irrigation and spray irrigation were run in some cases.

The combinations provided excellent flocculation and/or soil retention at doses at which the activated starch alone or the PAM alone exhibited little or no activity. Flocculation activity in the various assays was good at doses of 1 to 30 ppm with ratios up to 30:1 of activated starch:PAM. In the field work, the formulation of activated starch and PAM at ratios of 10:1 and higher performed at parity to PAM at equivalent doses, even though the actual dose of PAM was up to ten-fold lower in the synergistic formulation. The combinations also provided greatly improved water infiltration, where even higher doses of PAM provided no apparent benefit.

Combinations of activated maleamate-derivatized starch with PAM, also in ratios ranging from 10:0.3 to 10:5, were prepared as described in Example 17. In the soil vial (static; flocculation) and soil rill (fluid flow; soil retention) assays, this formulation performed very well at doses at which the control treatments (no additive, starch-maleamate alone, or PAM alone) exhibited little or no activity. In addition, performance was generally about 25-50% improved over that shown by the activated starch:PAM formulations at equivalent doses.

Three-component formulations containing activated starch, starch-maleamate, and PAM were prepared and evaluated, as described in Example 18, employing ratios from 1:1:1 to 10:10:1, preferably 5:5:1 to 10:10:1. Again, in the soil vial (static) and soil rill (fluid flow) assays, this formulation performed very well at doses at which the control treatments (no additive, starch-maleamate alone, or PAM alone) exhibited little or no flocculation activity. Performance was generally about two-fold improved over that shown by the activated starch:PAM formulations at equivalent doses (i.e. 1 ppm performed at parity to 2 ppm activated starch/PAM).

In a useful modification of these formulations, inorganic salts, such as ammonium, potassium, calcium, and magnesium salts, can be added to reduce viscosity, thus allowing easier handling of more concentrated formulations. The salts are typically added at a level of 5-10 wt %, depending on the water solubility of the salt. However, levels of 1-50%, more preferably 5-25% or 5-15%, can also be useful. Example 25 provides an illustration of reduction of viscosity by addition of calcium chloride dihydrate or ammonium sulfate to starch/PAM formulations.

Preservatives are also recommended to prevent degradation of the starch or microbial growth. Addition of about 6 to 15 ppm of a thiazolone-type preservative, such as Kathon®, is found to be suitable.

See Section V below for further discussion of these compositions, including performance as soil retention and water infiltration agents.

B. Compositions with Amino Acid Copolymers

Copolymers of aspartate (Asp), asparagine (Asn), and succinimide (Suc), in various combinations, can be used in combination with activated and/or derivatized starches, as described herein for acrylamide polymers, to produce flocculating, soil retaining and/or dust control compositions. Preferred weight ratios of copolymer to starch are similar to those noted above; e.g. about 1:1 to 100:1 starch/copolymer, preferably about 5:1 to 30:1 starch/copolymer.

Copolymers having a high asparagine content, e.g. about 2:1 to 4:1 asparagine/aspartate, are generally preferred. These polymers exhibit good activity as flocculants and controlled release via further solvation over time.

In another embodiment, improved flocculating activity is provided by lightly crosslinking such polymers, as described further below. Finally, water-soluble terpolymers of aspartate, asparagine, and succinimide are particularly useful for covalent grafting to starch, to produce grafted compositions that are useful as flocculants. For this purpose, low molecular weight polymers are generally preferred.

B1. Preparation of Amino Acid Copolymers

Copolymers of aspartate (Asp), asparagine (Asn), and succinimide (Suc) can be prepared by methods described in Sikes et al. (U.S. Pat. Nos. 5,981,691; 6,495,658; 6,825, 313). For example, copolymers of aspartate and asparagine can be prepared from polysuccinimide by ring opening with ammonia or ammonium hydroxide in water. Polysuccinimides, in turn, can be produced via routes such as dry thermal polymerization of aspartic acid powder, producing molecular weights of 3 to 5 kDa (Example 11). Addition of a phosphoric or polyphosphoric acid produces molecular weights in the range of 30,000 Daltons (Example 2). Molecules as large as 180,000 Daltons can be produced via an acid solubilization step coupled with phosphoric or polyphosphoric catalysis (i.e.; aspartic acid powder is completely dissolved in water, prior to addition of the polyphosphoric catalyst, and water is then removed to produce a mixture ready for polymerization). Each of these approaches, along with other methods for production of polysuccinimide, is detailed in Sikes, U.S. Pat. No. 7,053,170.

Disclosed herein is an improved method for preparing very high MW polysuccinimides of linear morphology and minimal branching, with MWs up to about 300,000 Da. This approach, as described in Example 3, employs treatment of aspartic acid powder in a soaking step using phosphoric/polyphosphoric acid with minimal water. Accordingly, aspartic acid powder was first soaked in a catalyst-containing aqueous fluid (40% aqueous polyphosphoric acid) that was just sufficient to cover the powder. This composition was dried at 80° C. overnight in a forced-air oven, then further dried at 120° C. under vacuum prior to polymerization, and then again at 190° C. for 4 hours under vacuum. The polysuccinimides so produced are light, off-white materials. Again, MW's of 180,000 and higher were routinely achieved at 30% catalyst via this method. These polymers have minimal or no branching.

Polysuccinimides of defined MW's ranging from 7,000 and higher can also be produced via this approach, simply by lowering the catalyst loading. For example, a polysuccinimide of MW 10,000 was so produced at a catalyst concentration of 2%, and MW 15,000 with the catalyst at 3% to 4%, by weight of the aspartic powder.

As noted above, copolymers of aspartate and asparagine can be prepared from polysuccinimide by ring opening with ammonia or ammonium hydroxide in water.

Alternatively, low MW aspartate/succinimide copolymers may be prepared directly, as described by Sikes et al. (U.S. Pat. Nos. 5,981,691 and 6,495,658), by thermal condensation of an intimate mixture of ammonium and sodium aspartate (produced by drying a solution of the two salts, prepared by adding NaOH to ammonium aspartate). The aspartate/succinimide residue ratio is dependent on the ratio of sodium aspartate and ammonium aspartate in the original mixture.

As disclosed herein, a useful modification to this process, as described in Example 4, involves back-titration of an ammonium/sodium aspartate solution into the pH range of 3-5 prior to drying; this produces polymers having higher succinimide content and better color. In another modification disclosed herein, also useful in circumstances where low MW copolymers are preferred, an anionic counterion is added, which is effective to block some aspartic amine groups from polymerization. This modification is described further in Example 4.

These aspartate/succinimide copolymers can be converted to aspartate/asparagine copolymers by reaction with aqueous ammonia, as described, for example, in Examples 5 and 8a. In another approach, described in Example 9, polysuccinimide is converted directly to an asp/asn copolymer having a high asparagine content (approximately 80 mol % or greater) by reaction with excess ammonia at low temperatures (e.g. 2 to 4° C.).

The Asp/Asn copolymers can in turn be converted to water-soluble terpolymers of aspartate, asparagine, and succinimide (see e.g. Examples 6 and 8b), by thermal ring closing of some fraction of the asparagine residues.

B2. Compositions with Polysaccharides

The above-described copolymers and terpolymers of aspartate (Asp), asparagine (Asn), and/or succinimide (Suc) can be used in combination with activated and/or derivatized starches, as described herein for acrylamide polymers, to produce flocculating, soil retaining and/or dust control compositions. Preferred weight ratios of copolymer to starch in these compositions are similar to those noted above; e.g. about 1:1 to 100:1 starch/copolymer, preferably about 5:1 to 30:1 starch/copolymer. Terpolymers, particularly those with high asparagine content, are also particularly useful for grafting with starch in preparation of flocculants. These materials can be tested using the assays described in Examples 26-29 for evaluation of these properties. For example, the grafting of various terpolymers to activated starch, by reaction at basic pH, is described in Example 13. The product was assessed as a flocculant via the soil-vial assay (Example 26a), exhibiting some initial activity, with excellent activity developing over a period of 1 week. The activity persisted for several months before fading. The terpolymers with higher mole % asparagine were generally found to produce the most effective flocculants.

It is found, conversely, that terpolymers having lower mole % asparagine and correspondingly higher mole % aspartate exhibited an increasing tendency towards dispersion activity rather than flocculation activity. Accordingly, dispersion of suspended or emulsified particles, in a mixture comprising said particles and water, is promoted by applying to, or including in, said mixture, a composition comprising an aspartate/asparagine/succinimide terpolymer of grafted to starch, wherein the mole % of aspartate residues in the terpolymer is 30% or greater, preferably 50% or greater.

The grafted terpolymers in both cases are preferably of relatively low molecular weight, (prior to grafting); e.g. less than 5000 Da, preferably less than 2000 Da.

IV. Crosslinked Amino Acid Polymers

As described above, copolymers of aspartate, asparagine, and/or succinimide can be combined with activated and/or modified starches to produce flocculating compositions. The flocculating properties of copolymers of aspartate and asparagine, preferably having a high asparagine residue content, e.g. >50 mole %, more preferably >75 mole %, are enhanced by lightly crosslinking the copolymers to produce a greater effective molecular size. A mole ratio of about 80-85:20-15 asparagine/aspartate is particularly preferred, with the 15-20 mole % aspartate providing water solubility.

Preferably, the polymers to be crosslinked have a substantially linear morphology, allowing molecules to have sufficient length to bridge soil particles in suspension, causing them to flocculate and settle. Light crosslinking of such copolymers, as described herein, can be effective to increase effective size and thus improve flocculating activity, while still maintaining water solubility of the polymers. In this case, although linear starting polymers of high molecular weight (i.e. 100 KDa or more) are preferred, smaller molecules having low to moderate levels of branching also can be used to build crosslinked flocculants. See, for example, the data in Table 1 below.

Numerous bifunctional and polyfunctional agents, typically polyols and polyamines, can be used for crosslinking. Preferred crosslinkers include diamino compounds, such as diaminohexane, ethylenediamine, and lysine, diols, such as 1,2- or 1,3-propanediol, and polyols such as glycerol. Polymeric crosslinkers, such as polylysine, may also be employed. Preferred are diaminoalkanes or alkanediols, having backbones containing 2 to 8, preferably 3 to 6, carbon atoms. The diaminoalkane or alkanediol may be, for example, a 1,2-, 1,3-, 1,4-, 1,5-, or 1,6-diamine or diol. Diamines are particularly preferred; an exemplary crosslinker is 1,6-diaminohexane (DAH).

The amount of crosslinker should be enough to produce constructs of sufficient size and flocculating activity while retaining water-solubility. Effective molar ratios of monomeric residues in the copolymer to crosslinker are generally in the range of about 20-35:1 for high MW copolymers (e.g. 100 KDa or greater), about 1-30:1 for medium MW copolymers (e.g. about 10 to 100 KDa), and about 1-10:1 for low MW copolymers (e.g. less than 10 KDa).

As described in Example 11 below, the crosslinked copolymers may be prepared in a single step from polysuccinimide, via simultaneous ring opening and crosslinking. A low temperature process in which excess ammonia is added to the polymer, as described above, is preferred to produce a high residue ratio of asparagine. Alternatively, preformed aspartate/asparagine copolymers may be reacted with crosslinkers, as described in Example 10 below.

Table 2 includes flocculation data on various crosslinked amino acid polymers prepared as described herein. Several of the crosslinked copolymers exhibited flocculation properties equivalent or superior to PAM, as indicated. In some cases, activity increased over time, presumably via further dissolution of the active agent.

TABLE 1

Summary of Crosslinking Reactions: Copoly(Asp/Asn) materials for use as flocculants.

| Expt. | MW of starting | Mol % | Crosslinker | Mole ratio(s), |
|---|---|---|---|---|
| 1 | 180,000 | 48% | lysine | 10:1 |
| 2 | 180,000 | 48% | dah | 10:1 |
| 3 | 180,000 | 83% | dah | 10:0.75, 0.625, 0.5, 0.375 |
| 4 | 30,000 | 50% | dah | 10:1, 0.75, 0.5, 0.25 |
| 5 | 30,000 | 75% | dah | 10:0.75, 0.625, 0.5, 0.375 |
| 6 | 30,000 | 83% | dah | 10:0.4, 0.3, 0.2 |
| 7 | 30,000 | 75% | dah/pdiol | 10:(0.19 + 0.19) |
| 8 | 30,000 | 78% | pdiol | 10:0.75, 0.625, 0.5, 0.375 |
| 9 | 30,000 | 82% | glycerol | 10:0.375, 0.25, 0.2, 0.15 |
| 10 | 30,000 | 83% | lysine HCl | 10:2, 1, 0.7 |
| 11 | 30,000 | 80% | polyLys | 10:1 |
| 12 | 30,000 | 80% | polyLys | 5:, 2:1, 1:1 |
| 13 | 5,000 | 83% | dah | 10:1, 0.5 |
| 14 | 5,000 | 80% | lysine HCl | 10:2, 1, 0.7 |
| 15 | 5,000 | 80% | polyLys | 10:2, 1, 0.7 |
| 16 | 5,000 | 80% | lysine HCl | 10:10, 7.5, 5 |
| 17 | 5,000 | 80% | polyLys | 10:1 |

Notes:
Experiments 1-12 employed the procedure of Example 10; experiments 13-17 employed the procedure of Example 11.
The notation for % Asn refers to the residue mol % of copolymer as Asn via titration data.
Crosslinkers used were diaminohexane (dah); lysine HCl (Lys); polylysine (polyLys); 1,2-propanediol (pdiol); and glycerol. The polylysine was prepared by thermal treatment of lysine (free base) at 180° C. for 8 hours.
The ratio of polymer to crosslinker is given as residue-mole succinimide: mole of crosslinker molecule for dah, lys, pdiol, and glycerol. For polylysine, the ratio is given on a weight basis.

TABLE 2

Summary of Flocculation Properties for Crosslinked Copolymers of Table 1.

| Expt. | Flocculation activity (vs. PAM control) |
|---|---|
| 1 | No flocculation activity observed. |
| 2 | No initial activity: activity develops after two days, but <PAM. |
| 3 | Partially soluble, better solubility when mortared to fine powder; moderate initial activity, activity increases at 2 h; 10:0.5 ratio most effective, ≥PAM. |
| 4 | 10:0.5 ratio: No initial activity; partially soluble, coarsely ground particles; by 24 hrs approx. = PAM. 10:0.75 ratio: Some initial activity, by 24 hrs ≥PAM. |
| 5 | 10:0.5 and 10:0.375 ratios: Good activity in 15 min., by 2 h, ≥PAM. |
| 6 | All samples mostly soluble, all with good activity; 10:0.3 ratio most active, good initial activity, by 24 h ≥PAM. |
| 7 | Some initial activity, improves with time, but <PAM. |
| 8 | Some flocculation activity with time, but <PAM. |
| 9 | Good activity with time, 10:0.25 ratio best, but <PAM. |
| 10 | No initial activity, moderate activity after 5 days. |
| 11 | Partially soluble, some initial activity, good activity within 7 days, but <PAM. |
| 12 | Good initial activity, all ≥PAM within 3 days: 1:1 ratio > 2:1 > 5:1. |
| 13 | 10:0.5 ratio: Mostly soluble, little activity. 10:1 ratio: Partially soluble as large solid pieces, some initial activity; when ground to fine particles, improved solubility, good initial activity, comparable to PAM within 2 hours. |
| 14 | No initial activity, excellent activity by 6 days; 10:2 ratio > 10:1 > 10:7 ≥PAM. |
| 15 | No initial activity, some activity with time, but <PAM. |
| 16 | No initial activity, excellent activity after 5 days, ≥PAM. |
| 17 | Partially soluble, some initial activity, comparable to PAM by 7 days. |

V. Flocculation, Soil Retention, Water Infiltration, and Dust Control Assays: Exemplary Data

A. Flocculation

Static flocculation properties were evaluated by means of a soil-vial flocculation assay, described in Example 26a; and/or a soil-cuvette flocculation assay, described in Example 26b. Briefly, in the soil-vial assay, a soil sample is suspended in distilled water, the sample is vortexed, and the test additive composition is pipetted into the vial from a stock solution. The suspension is stirred gently, then allowed to settle for 3 minutes. Settling is visually assessed by observation in a light field alongside control vials with zero additive and/or with specific amounts of commercial PAM. In the soil-cuvette assay, aliquots are withdrawn from the suspended samples, and absorbance is measured at intervals at, for example, 400 nm, to determine decrease in light scattering by the suspended soil particles over time occurred as the fluid clarifies.

The soil-cuvette assay was carried out for soil samples (25 mg in 10 ml water containing 0.1 M $CaCl_2$) containing either no additive, 0.667 ppm PAM (Cytec A110), or the same amount of PAM plus 3.33 ppm activated starch. Specifically, the samples designated "PL pr1" through "PL pr3" included the same amount (0.667 ppm) of PAM in combination with 3.33 ppm activated potato starch. The three PL formulations differed in type of preservative: the "pr1" formulation included the preservatives Kathon® (2-octylthiazol-3-one), at a level of 6 ppm of a 4.5% PAM/starch formulation; the "pr2" formulation included the preservative methyl paraben, at a level of 0.1 wt % of a 4.5% PAM/starch formulation; and the "pr3" formulation included the preservative potassium sorbate, also at a level of 0.1 wt % of a 4.5% PAM/starch formulation.

This amount of activated starch (i.e. 3.33 ppm) had no significant effect on settling in this experiment when used alone. As shown in FIG. 1, however, its presence significantly improved flocculation activity of the combinations relative to PAM alone. (In this experiment, the data used was part of a set of measurements that had been taken daily over a period of a month. Accordingly, the effectiveness of the different preservatives had a large impact on the observed results. By the end of the month, the paraben- and sorbate-containing formulations had developed microbial contamination; hence, these compositions were less effective than the Kathon®-containing formulation. In remaining experiments, the formulations did not contain preservatives and were used within days after preparation; contamination was not a factor.) It was also observed that the activated polysaccharide was quite effective as a flocculant at higher levels, e.g. 10 to 30 ppm (data not shown).

B. Soil Retention

For efficient soil retention, i.e. prevention of erosion, flocculation activity in itself is required, but, in addition, the flocs or particles that form must be stable and dense enough to withstand conditions of fluid flow, such as occur during furrow irrigation, or the dynamics of droplet impact during spray irrigation.

Flocculation under conditions of fluid flow was evaluated by means of a soil rill assay, employing a lab-scale simulation of furrow irrigation, as described in Example 27. In this assay, water, with and without additives, is pumped down a simulated, sloped soil furrow, and the outflow is collected in a reservoir. During flow, phenomena such as stability of the soil at the point of inflow, tendency to form channels along the rill, stability of the soil along the rill, presence or absence of floc deposits along the rill, etc., are observed visually. The time until first outflow is recorded, and the amount of soil and water collected during a predetermined time is determined. The sediment could be dried and weighed, or, preferably, the height of the sediment in the vial was measured as an indicator of erosion (i.e. lack of soil retention).

Effectiveness of soil retention could also be readily ascertained from visual inspection of the rill itself, which, when stabilized by an effective soil-retention agent, exhibited a smooth, somewhat shiny, stable soil surface, with little or no erosion evident. In control treatments, on the other hand, the flow generated a pattern of eroded meanders and excavations with an appearance much like an actual flow down a hillside.

Figure 8:
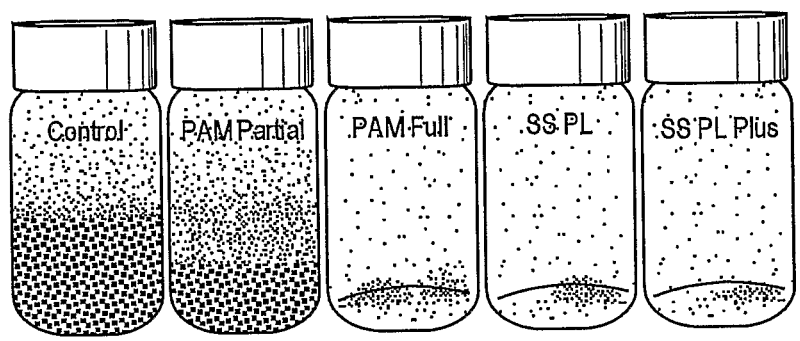
FIG. 8. Representative results of experiments using the apparatus of FIG. 7, in which the first 20 ml of outflow was collected in vials. In the control treatment, the initial outflow contained approximately 50% by volume eroded soil. In treatments that were fully stabilized by PAM (PAM full; depending on flow rates and slope, the doses ranged from 0.5 to 10 ppm), there was little or no sediment in the outflow. Treatments at intermediate doses (PAM partial; e.g. 0.75 ppm) gave intermediate levels of eroded soil in the initial outflow, e.g. 10 to 40% by volume. By comparison, the activated starch/PAM (here designated as SS PL, at a PAM dose equivalent to ⅔ of the above "PAM partial" treatment) and activated starch/starch-maleamate/PAM (designated SS PL Plus, using ⅔ the PAM dose of the SS PL treatment) also stabilized the soil in the minifurrow completely so that there was little or no sediment in the initial outflow. (See further description in Section V.B below and Example 27.)

In control experiments, using water with no additives, the collecting vial (20 ml) was typically filled 50% or more (i.e. 10 ml or more) with eroded soil in dark, turbid outflow (see FIG. 8). In an experiment using 0.75 ppm PAM ("PAM partial"), an intermediate amount of soil was present in the outflow (about 4-5 ml depth). Examples of very effective treatments included: 3 ppm PAM ("PAM full"); 3 ppm activated starch/PAM (0.5 ppm PAM plus 2.5 ppm activated starch; "SS PL"); and 2 ppm activated starch-maleamate/PAM (0.33 ppm PAM plus 1.67 activated starch-maleamate; "SS PL Plus"). In these cases, the collecting vial was almost completely clear of sediment (FIG. 8).

As discussed above, the modified starch compositions alone are good flocculants in static systems, and provide the benefit of extended release properties, but they are generally less effective under conditions of fluid flow when used alone. However, as shown by the results above, the addition of these materials to small amounts of PAM (0.33-0.5 ppm) provided clearly superior benefits to larger amounts of PAM (0.75 ppm) used alone.

C. Water Infiltration

The promotion of uptake of water by soil (water infiltration) was assessed via two laboratory assays, as described in Examples 28a-b, then verified via field measurements. In the first, "static" infiltration assay, infiltration of water into soil samples is measured as the water percolates into soil held in vertically placed clear cylinders. Depth of infiltration versus time, as well as time of first outflow and total volume of outflow, are recorded.

Figure 2A:
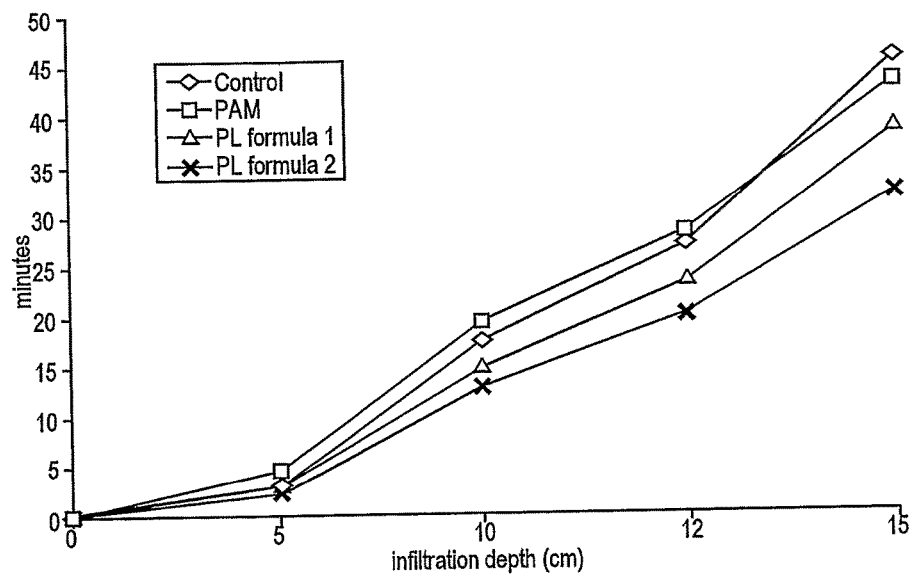
FIGS. 2A-B. Static water-infiltration representative results, carried out as described in Example 28a. Control treatments consisted of infiltration of soil with tap water. The PAM and PL treatments each included 2 ppm PAM, while the PL treatments further included 10 ppm activated starch (in FIG. 2A, formula 1=suspension activated; formula 2=ColdSwell™ 1111 provided by KMC, Denmark).
Figure 2B:
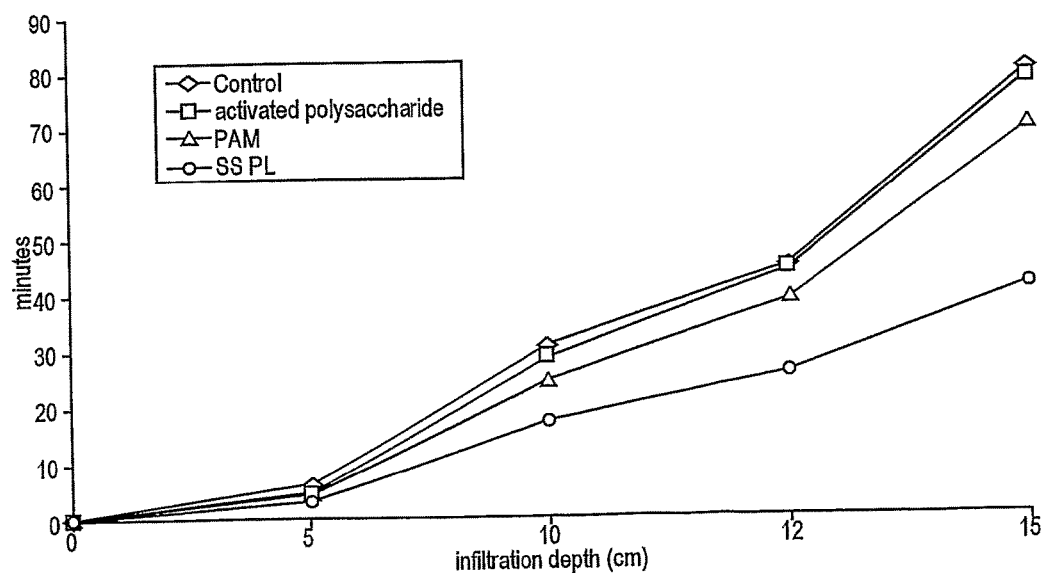

Some representative results that illustrate the improved infiltration of water using the present compositions are shown in FIG. 2. The control treatment consisted of infiltration of soil with tap water. Additives tested included PAM (Cytec A110, 2 ppm) and PAM/activated starch combinations, where "formula 1" included 2 ppm PAM plus 10 ppm activated potato starch (per Example 12a), and "formula 2" included 2 ppm PAM plus 10 ppm ColdSwell™ 1111 (KMC) potato starch. In the PAM/starch treatments, the water infiltrated to significantly greater depths significantly faster than did control and PAM treatments. Under the conditions of this laboratory assessment, PAM and the control exhibited essentially equivalent rates of water infiltration. This observation was also made in the field, as described further below.

Figure 3:
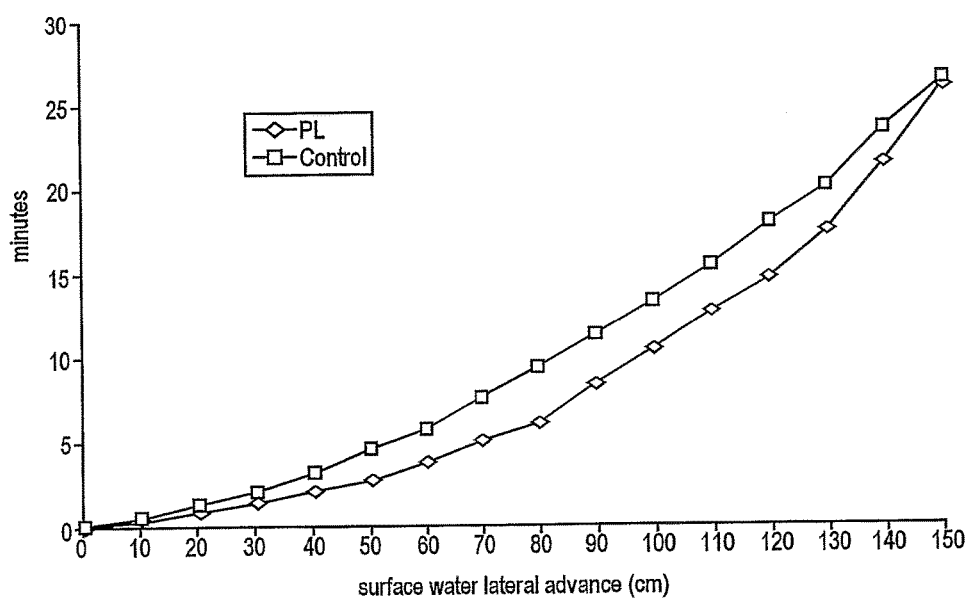
FIGS. 3-5. Representative dynamic water infiltration results, carried out as described in Example 28b, using the formulation designated "PL formula 2" in FIG. 2A. Figures show rate of surface water lateral advance; time of infiltration to increasing depths; and surface water advance versus infiltration depth, respectively. Water treated with this formulation advanced laterally along the surface more quickly (FIG. 3), infiltrated to greater depths more quickly (FIG. 4), and infiltrated to greater depths for a given amount of lateral advance (FIG. 5) than in control treatments with no additive. (Some of these figures suggest that the control data began to converge with the PL data after about 80 cm lateral advance or 8 cm depth. This observation is an artifact of the experimental setup; at this point, the water had reached the bottom of the plastic support in the test apparatus and began to flow quickly along the support.)
Figure 4:
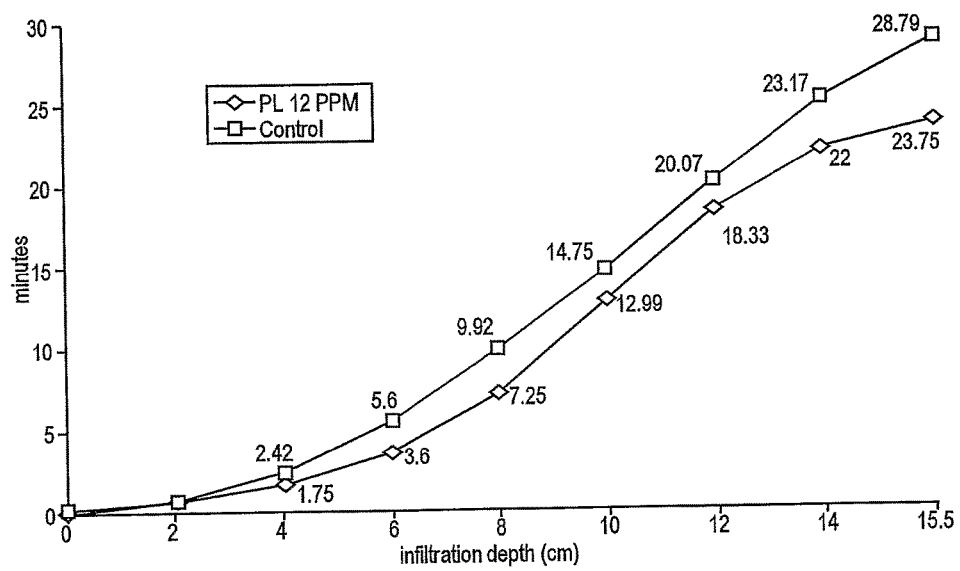
Figure 5:
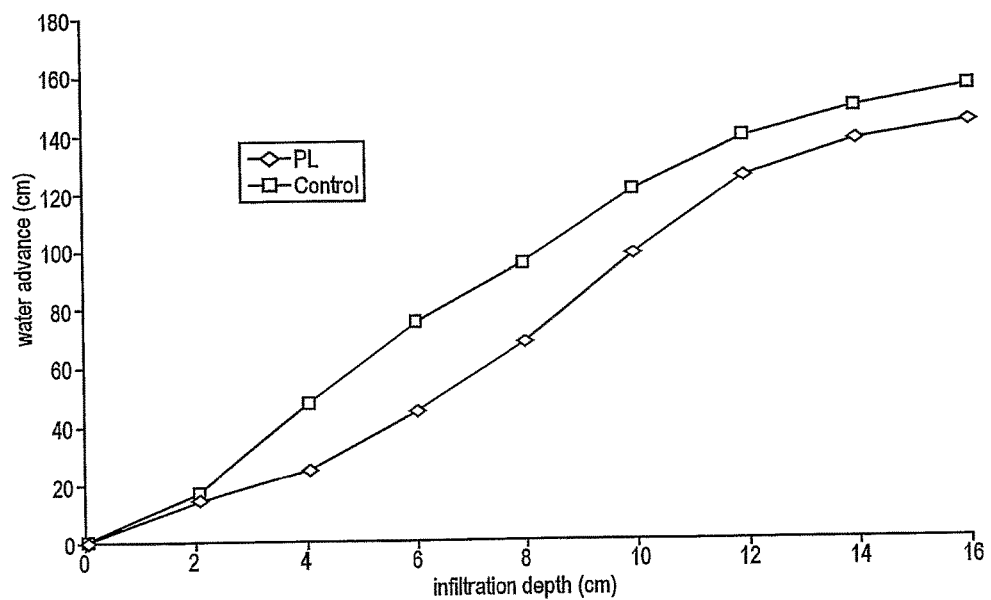

In the second, "dynamic" assay, infiltration of water into soil was measured as the water was pumped down a rill containing loosely packed soil. The soil was held in a transparent support so that depth of infiltration, as well as lateral infiltration, could be observed. Some representative results are shown in FIGS. 3-5; in these tests, only the combination agent was employed, along with a control containing no additive. FIG. 3 shows the increase in lateral advance at a given time point for water containing PAM/ activated starch (2 ppm PAM plus 10 ppm ColdSwell™ 1111 (KMC) potato starch) ("PL") vs. the control with no additive. FIG. 4 shows the increase in infiltration depth at a given time point for the same compositions, and FIG. 5 shows greater depth infiltration of water for a given amount of lateral advancement for the PAM/starch formulation vs. the control. (Some of the figures suggest that the control data began to converge with the PL data after about 80 cm lateral advance or 8 cm depth. This observation is an artifact of the experimental setup; at this point, the water had reached the bottom of the plastic support in the test apparatus and began to flow quickly along the support.)

D. Field Tests: Soil Retention; Water Infiltration

Once a candidate molecule or formulation had shown promising performance at parity or better to commercial PAM as a flocculent, soil-retention agent and/or water-infiltration agent, arrangements were made for testing in actual furrow and spray irrigations on agricultural fields. Test sites were in Idaho and California. Comparisons of experimental results were made in side-by-side assessments relative to control treatments with no additives and with commercial PAM. In furrow irrigation trials, typical flows were purposely set a high levels ranging in general from 5 to 7 gallons per minute and up to 12 gallons per minute along furrows ranging from 300 to 600 feet, with dosing between 1 and 10 ppm of active agents. In spray irrigation, typical applications were 2 to 3 pounds of active agents injected into 0.06 acre-foot of water per acre (approx 12-18 ppm) using standard irrigation application equipment.

The combination agents, containing low doses of PAM plus activated starch, performed at parity with conventional applications of PAM in the area of soil retention. Testing was done using 5:1 activated starch:PAM (designated "PL") at levels of 6, 12, and 18 ppm, and using PAM at 2 and 10 ppm. Some erosion was observed at 6 ppm PL and 2 ppm PAM; none was observed at 12 and 18 ppm PL and at 10 ppm PAM.

In contrast to benefits observed in soil retention, the PAM treatments alone had little or no effect on water infiltration under the conditions of the trial. The PL treatments, on the other hand, even at 6 ppm, exhibited marked increases in water infiltration; i.e. a 10 to 20% increase relative to controls (no additives) and PAM treatments. In practice, over a typical furrow length (e.g. 500 feet to a ¼ mile), because the improved infiltration effects compound with time, the impact of such a change can be substantial. It was observed that, while the untreated or PAM-treated water in these tests reached the end of the field in 2 hours, the PL-treated water (at the same monitored inflow rate) could take 6 hours to go the same distance. This difference could be attributed to the PL-treated water infiltrating to a greater depth as well as going into the soil particles to a greater extent, rather than flowing around and over them. The difference was seen to diminish as the flow rate was increased to 7.5 to 9 gallons per minute per furrow; however, this rate is considerably greater than used in normal practice (upwards of 4 gallons per minute) for this type of furrow irrigation which were set on slopes in the range of 1.5 to 2 degrees.

In view of the above results, the activated starch and modified starch compositions described herein are recommended for use in improving water infiltration, e.g. in irrigation settings, both alone and in combination with acrylamide polymers, particularly PAM. As shown for the conditions above, levels of 5-15 ppm of the activated and/or modified starches can be used for this purpose, alone or in combination with 1-3 ppm of PAM. Inclusion of these low doses of PAM clearly provides benefits in soil retention, as shown by the data and results herein.

E. Dust Control

Effectiveness of the compositions described herein for dust control was evaluated using an assay described in Example 29. Briefly, in a process designed to mimic the spraying and drying cycle of a dust control agent sprayed onto a dusty surface, test additives were added to a soil/water mixture (25 mg/2 ml), following by brief mixing, and the mixture was placed in a forced air oven at 80° C. until dry. The soil residue adhering to the container surface was covered with water and vortexed, and the turbidity and settling of the resulting fluid were assessed as a measure of the stabilization of the soil surface by the additive. Effective dust control was evidenced by clear or nearly clear fluid layers after vortexing, and/or by rapid settling of particles. Controls (with no additive) produced turbid fluids that clarified slowly. PAM, used at a dose of 100 µg, routinely produced turbid fluids, which clarified quickly, but not as quickly as those produced by the flocculating agents disclosed herein, including activated starch used alone, maleamate-derivatized starch used alone, and each of the starch/copolymer formulations described above.

F. Compatibility with Other Agricultural Products

The starch-acrylamide formulations described herein were found to be highly compatible with commonly used commercial fertilizers and with existing commercial soil penetrant products.

As an example of the former, an exemplary formulation containing activated starch (Coldswell™ 1111) and PAM (Superfloc® A-110) at 4.5% actives in water (3.75% starch and 0.75% PAM), plus 15 ppm isothiazolinone as a preservative, was formulated, on a 1:1 weight basis, with commercial fertilizers containing either ammonium nitrate and urea at 32% total actives (16% of each) or ammonium sulfate at 40% actives. The resulting products were evaluated using the vial, cuvette, and rill assays described in Examples 26-27. The performance of the PAM/starch product as a flocculant and soil retention agent was unaffected by the presence of the fertilizers.

As an example of the latter, the same exemplary starch/PAM formulation was formulated, on a 1:1 weight basis, with a commercial soil surfactant and wetting agent containing 10% alkoxylated polyol and 7% gluco-ether. The resulting products were evaluated using the vial, cuvette, and rill assays described in Examples 26-27. The performance of the PAM/starch product as a flocculant and soil retention agent was unaffected or improved by the presence of the soil surfactant (which, when used alone, exhibited no activity as a soil retention agent, and acted as a dispersant at higher doses, promoting erosion rather than retention).

VI. Clarification of Process Waters from Oil-Sands Mining

Another technology in which improved flocculants are sought is in oil-sands mining and processing. In general, oil-sands deposits consist of sand and bitumen, a semi-solid hydrocarbon material that must be liquefied in order to be transported through a pipeline. Approximately eighty percent of the oil-sands deposits in Northern Alberta, Canada are too deep to recover by surface mining techniques, and must be recovered via wells which are drilled into the deposits. A currently favored technique is steam-assisted gravity drainage (SAGD), in which a large underground dome of super-heated steam is formed via steam injection into a series of upper wells, liquefying the hydrocarbon material, which then flows downwards into wells positioned below the steam-heated dome. The oil is pumped upward to recovery operations at the surface.

In this process, at the surface, roughly three barrels of oily and bituminous-containing water are produced per barrel of oil. This process water is eventually recycled into the steam generators, but it must first be sent to a processing plant for clarification. The water is initially at a temperature of 90-95° C. at start of processing; and after various clarification and purification steps, it may be closer to 80° C. before it is recycled to the steam generators. Consequently, the clarification and separation steps need to be effective at 95° C. or higher, and preferably remain effective for residence times on the order of several hours or more.

Because of the high oily and bituminous content of the process waters, ranging roughly from 1% to 60% solids, and the elevated temperatures involved, it has been challenging to design effective water-treatment protocols that clarify the water and provide good separation of the aqueous and petrochemical phases. Current practice for clarification of oil-sands process water employs multistep processes using high levels of particulate clarifying agents, inorganic salts (e.g. aluminum, iron, magnesium or calcium salts) and/or polycationic agents for de-emulsification and coagulation. Over a period of several hours, a loosely flocculated solid material becomes separated from the water, which can then be recycled to the steam generators. However, this water often contains high levels of the additives noted above, and separation of oily solids can still be inadequate.

A significantly improved method and compositions for clarifying such process waters is disclosed herein. This method provides high clarification at surprisingly low doses of active agents, with easily separable aqueous and petrochemical phases. Moreover, the separation can be accomplished in a few minutes, as compared to several hours or more via current commercial methods.

The invention process preferably includes a first step of neutralizing the oily, bituminous materials, thus destabilizing the oil-in-water emulsion. In this step, the pH is adjusted into the range of about 2 to 4, preferably about 3 to 3.8, which neutralizes carboxylic-containing organic phases which would otherwise act as dispersing agents to stabilize the emulsion.

In one embodiment of the process, addition of a polycationic coagulant follows this pH adjustment. A preferred polycation for this step is copolymerized epichlorohydrin and dimethyl amine, or poly EPI/DMA. Typically, upon addition of the polycationic coagulant, the oily droplets are further de-emulsified and tend to slowly coalesce and separate from the water. With adequate stirring, an interval of approximately 30 seconds is sufficient for this step, although longer intervals are effective as well.

Other polycationic coagulants that may be used at this stage include polymers of cationic monomers such as ammonium alkyl acrylamides (e.g. quaternized dimethylaminopropyl acrylamide), ammonium alkyl methacrylamides (e.g. 3-methacrylamidopropyl trimethylammonium chloride), ammonium alkyl acrylates (e.g. 2-acrylatoethyl triethylammonium chloride), ammonium alkyl methacrylates (e.g. quaternized dimethylaminoethyl methacrylate), diallyl dialkylammonium salts (e.g. diallyl dimethyl ammonium chloride), allyl trialkyl ammonium salts, and amino acids such as lysine or ornithine. The cationic monomer is present at least 50 mole %, preferably at least 70%, and more preferably at least 80 mole %. In one embodiment, the polymer is a homopolymer. Other monomers, if present, are neutral monomers such as acrylamide or methyl (meth) acrylate. Examples are homopolymers of diallyl dialkylammonium salts or allyl trialkyl ammonium salts.

The molecular weight of the polycationic coagulant is generally at least 5000, though higher molecular weights, e.g. 20,000, 50,000, 75,000, or about 100,000 Daltons, can be used and may be more effective. The molecular weight of the coagulant is generally less than 1 million Daltons, and preferably less than 500 kDa.

The amount of polycationic coagulant used is generally in the range of 1 to 100 ppm, preferably 5 to 50 ppm or 10-20 ppm. Levels of 2.5, 5, and 10 ppm, in combination with similar levels of flocculant (described below) were effective in field tests, as shown in the Examples below. A level of 20 ppm, in combination with 40 ppm flocculant, was effective even in downstream wastewaters having about 60% solids (Example 38). This level is clearly substantially less than the several hundred or thousands of ppm of such agents which are commonly used in current practice.

The preferred process further employs a flocculant material, which may be added together with or following the polycationic coagulant, when the latter is employed. The flocculant is a water-soluble, high molecular weight hydrogen-bonding agent which serves to bridge the droplets and bituminous particulates, flocculate them and bring them quickly out of solution or emulsion. Preferred hydrogen-bonding agents are acrylamide copolymers. The copolymer may be an anionic acrylamide copolymer, such as an acrylamide/acrylate copolymer (as described above) or, in a preferred embodiment, a cationic acrylamide copolymer ("cationic PAM"), such as an acrylamide/allyl trialkyl ammonium copolymer. A representative cationic acrylamide copolymer is acrylamide/allyl triethyl ammonium chloride (ATAC) copolymer.

These acrylamide copolymers typically have about 50-95 mole %, preferably 70-90 mole %, and more preferably around 80-90 mole % acrylamide residues. The molecular weight of the flocculant copolymers is preferably about 5 to 30 million, more preferably 12 to 25 million, and most preferably 15 to 22 million Daltons. In each case, the mole % acrylamide is at least about 50%, and the molecular weight is at least 1 million Daltons, preferably at least 4 million Daltons.

Other cationic monomers that can be copolymerized with acrylamide to form a flocculant copolymer include those noted above, i.e. ammonium alkyl (meth)acrylamides, ammonium alkyl (meth)acrylates, diallyl dialkylammonium salts, and allyl trialkyl ammonium salts. As noted above, the mole % acrylamide in these flocculants is at least about 50%, and more preferably 80-90%.

The cationic acrylamide copolymers are generally more heat-stable in these settings than the anionic acrylamide copolymers. At temperatures above about 80° C., use of cationic PAM's produces separated flocs that remain stable for several hours or longer, even at 95° C.

In another preferred embodiment, the acrylamide copolymer is provided in combination with an activated polysaccharide, such as an activated starch, as described in Section II above. The ratio of these components (starch: copolymer) is typically in the range of 0.1:1 to 100:1, preferably 0.5:1 to 10:1, more preferably 1:1 to 5:1.

The activated polysaccharide is an extremely high molecular weight, water soluble entity having flocculating activity. Flocculated materials formed via the action of the PAM/activated polysaccharide compositions tend to be large and very light, having low density. These flocculated materials rapidly form into a robust and integrated floating layer that is easily skimmed or filtered, leaving behind a greatly clarified aqueous layer.

The activated polysaccharide is preferably an activated starch. As discussed in Section II above, activated wheat and coin starches tend to remain active at higher temperatures than activated potato starches, and thus are particularly useful in these high temperature processes. However, as shown in the Examples below, activated potato starch, particularly steam activated, pregelled starch, is also generally effective.

Addition of the flocculant composition preferably follows addition of the coagulant (e.g. poly EPI/DMA), when present, by an interval of 30-60 seconds, or more if desired.

Because the polycationic coagulant tends to interact with anionic flocculants (e.g. acrylamide/acrylate), their effective concentration will be lessened with respect to their interaction with the oily bituminous particles. However, these additives may be used together with good effect if the overall dosing is increased to counteract their mutual interaction.

The amount of flocculant composition used is generally in the range of 1 to 100 ppm, e.g. 2.5-50 or 10-30 ppm. Levels of 30 ppm alone, or 2.5, 5, or 10 ppm in combination with similar levels of a polycationic coagulant, were effective in field tests, as described in the Examples below. A level of 40 ppm, in combination with 20 ppm coagulant, was effective even in downstream wastewaters having about 60% solids (Example 38).

The coagulant and flocculant may be used in approximately equal amounts. Alternatively, they may be used in a ratio of up to about 2/1 flocculant to coagulant, or vice versa. Other ratios may also be used as effective.

The entire exemplary sequence (adjusting pH, staging in the coagulant, addition of the flocculant, and skimming/filtration to separate the aqueous layer from the oily/bituminous solids) can generally be accomplished in a few minutes. The pH of the aqueous layer may then be quickly neutralized via addition of alkali.

Certain steps in this exemplary sequence may be omitted, particularly if the others are enhanced accordingly. For example, the pH adjustment may be omitted (for example, to avoid possible corrosion of mild steel containers and pipes) if the dosing of coagulants and/or flocculants is increased to overcome the dispersancy that is inherent in the non-neutralized oily/bituminous phase. In practice, it is possible to clarify and separate the aqueous and petrochemical phases in a matter of a few minutes, employing actives concentrations in the range of 2.5-100 ppm, e.g. 10-60 ppm, if the pH adjustment is utilized. If the pH adjustment is not implemented, a combined concentration of actives of 100-500 ppm is typically required. However, this higher dosing is still generally much less than used in conventional treatments, and provides improvements in water clarity, rapidity or response, and ease of separation as compared to conventional treatments.

Conversely, the pH adjustment may be included but other steps omitted. A combination of the pH adjustment with subsequent addition of coagulant alone or flocculent alone can be an effective approach to clarification of the process water and separation of the aqueous and petrochemical phases, as shown in the tests summarized in Table 3 below.

It is interesting and useful to note that by varying the relative amounts of the additive agents, particularly with respect to the activated polysaccharide, the density of the flocculated solids layer may be adjusted to promote settling of the solids or, as indicated above, to produce a floating layer that rapidly rises to the top, which is often preferable in practice. In current practice, use of inorganic cationic flocculants, such as ferric salts or aluminum salts, tends to make the solids heavier so that they settle out of the aqueous layer. In the processes described herein, use of the polycationic coagulant alone also produces a solid layer that sinks. However, the flocculant compositions described herein, containing activated polysaccharides, tend to rapidly produce a low density solids layer which floats on top of a clarified aqueous layer.

In preliminary experiments, samples of process water from oil-sands mining were obtained for testing, as described in Example 23 below. These samples were dark amber in color, contained significant bitumen particulates, and had a definite gasoline-like odor. The process water was treated with an activated starch/anionic PAM (5:1) formulation, at 30 µg/ml, after first rendering the process water mildly acidic. The particulates and emulsified petrochemicals rapidly flocculated into a separate surface layer; the aqueous lower layer, which was much larger than the surface layer, quickly clarified and within minutes approached a water-white appearance.

Table 3 below summarizes effects of different parameters of the described processes on clarification of oil-sands process water in controlled experiments. As shown, addition of activated starch to PAM provides improved clarification at lower total additive concentration (entries 13-14 and 15 relative to entries 7-8 and 12, respectively). The most effective treatment employed addition of a polycationic coagulant followed by cationic PAM/activated starch (last entry). Further details of these experiments, including preparation of flocculant compositions, are provided in Examples 31-38 below.

TABLE 3

Clarification of Oil-Sands Process Waters

| Entry No. | Additive | Total additives, ppm | pH | Result |
|---|---|---|---|---|
| 1 | none | — | not adjusted | Stable reverse emulsion of oily/bituminous phase in process water. |
| 2 | none | — | adjusted to 3-3.8 | Process water slowly clarifies somewhat as small particulates settle over several hours. |
| 3 | poly Epi/DMA[1] | 100-500 | not adjusted | Process water slowly clarifies as small particulates settle over 3-6 hours or more. |

TABLE 3-continued

Clarification of Oil-Sands Process Waters

| Entry No. | Additive | Total additives, ppm | pH | Result |
|---|---|---|---|---|
| 4 | anionic PAM[2] | 100-500 | not adjusted | Process water changes quickly over several minutes into upper, clarifying aqueous layer, solids settle into lower layer. At temperatures > 80° C., flocs tend to disperse after 30 minutes. |
| 5 | cationic PAM[3] | 100-500 | not adjusted | Process water changes quickly over several minutes into upper, clarifying aqueous layer, solids settle into lower layer. At temperatures of 90-95° C., flocs are stable for several hours. |
| 6 | poly Epi/DMA | 10-100 | adjusted to 3-3.8 | Process water clarifies somewhat as small particulates settle over 10 minutes to 1 hour. |
| 7 | anionic PAM | 10-100 | adjusted to 3-3.8 | Process water forms quickly over several minutes into upper, clear, light yellowish aqueous layer, solids settle into lower layer. At temperatures > 80° C., flocs tend to disperse after 30 minutes. |
| 8 | cationic PAM | 10-100 | adjusted to 3-3.8 | Process water changes quickly over several minutes into upper, clarifying aqueous layer, solids settle into lower layer. At temperatures of 90-95° C., flocs are stable for several hours. |
| 9 | poly Epi/DMA and anionic PAM, added together | 100-500 | Not adjusted | Additives interfere with each other if added together, mixed as one stock solution. Not as effective as either added alone at equivalent doses. |
| 10 | poly Epi/DMA and cationic PAM, added together | 100-500 | not adjusted | Additives work well together, process water changes quickly into upper, clarifying aqueous layer, more clear than treatment with additives acting alone; solids stable at 90-95° C., settle into lower layer. |
| 11 | poly Epi/DMA and anionic PAM, added together | 5-100 | adjusted to 3-3.8 | Additives interfere with each other, better to add separately. Process water clarifies nicely into yellowish, clear upper layer; solids settle out, though not stable at temperatures > 80° C. |
| 12 | poly Epi/DMA and cationic PAM, added together | 5-100 | adjusted to 3-3.8 | Additives work well together, process water changes quickly into upper, light yellow layer, more clear than treatment with additives acting alone; solids stable at 90-95° C., settle into lower layer. |
| 13 | anionic PAM co-formulated with activated starch | 2.5-60 | adjusted to 3-3.8 | Excellent separation of clear, yellowish aqueous layer and solids layer within minutes: solids float depending on ratio of PAM and activated starch, solids begin to disperse at temperatures > 80° C. after 30 minutes. |
| 14 | cationic PAM co-formulated with activated starch | 2.5-60 | adjusted to 3-3.8 | Excellent separation of clear, yellowish aqueous layer and solids layer within minutes: solids float depending on ratio of PAM and activated starch, solids stable at 90-95° C. for several hours or more. |
| 15 | Poly Epi/DMA and cationic PAM co-formulated with activated starch, added together | 2.5-60 | adjusted to 3-3.8 | Excellent separation of clear, yellowish aqueous layer and solids layer within minutes: solids float depending on ratio of PAM and activated starch, solids stable at 90-95° C. for several hours or more. |

TABLE 3-continued

Clarification of Oil-Sands Process Waters

| Entry No. | Additive | Total additives, ppm | pH | Result |
|---|---|---|---|---|
| 16 | Poly Epi/DMA added first, then cationic PAM co-formulated with activated starch | 2.5-60 | adjusted to 3-3.8 | Best separation of all treatments: clear, light yellow aqueous layer and solids layer within minutes: solids float depending on ratio of PAM and activated starch, solids stable at 90-95° C. for several hours or more. |

[1]Poly Epi/DMA MW range assessed: 100,000 to 1,000,000. Similar activity for each MW, some improvement in activity at higher MWs. Poly Epi/DMA commercial preparations were provided as aqueous solutions at 50% actives.
[2]MW range assessed: 4,000,000 to 15,000,000. Best activity at highest MW. Anionicity assessed: 0 to 30% acrylate residue %, best activity at 10 to 20 residue % acrylate. Commercial anionic PAM's provided as granular powders at 100% actives; however containing up to 10% water.
[3]MW range assessed: 4,000,000 to 9,000,000. Best activity at highest MW. Cationicity assessed: 0 to 55% ATAC residue %, best activity at 10 to 20 residue % ATAC. Commercial cationic PAM's provided as granular powders at 100% actives; however containing up to 10% water.

VII. Dry Flocculating Agents

The flocculant compositions described herein can be rendered into dried products for later (optional) rehydration and use. This can be done by heating at moderate temperatures to partial dryness. For example, a 2% formulation of activated starch and PAM was treated overnight at 80° C. in a forced-air oven, to produce a material which retained up to 30% as water, based on weight analysis, but could be handled as a non-sticky "dry" material. The water may also be removed by other methods, such as spray-drying, freeze-drying, or solvent extraction. This dried material can be rehydrated at room temperature for preparation of new stock solutions. Alternatively, the material can be added in this semisolid form to a soil surface, in an amount equivalent to the amount that would be applied in solution, with similar success in stabilizing soil and minimizing erosion under water flow conditions.

It is also possible to blend dry preparations of commercially available, cold-water-soluble starches, such as Cold-Swell™ (KMC), with PAM or other flocculating polymers as described herein, to form a dry product for later preparation of aqueous compositions for use in soil-retention, water conservation, water clarification, and dust control. These starches are typically prepared as high MW, pre-gelled materials via aqueous heating using a drum drier, jet cooker plus spray drier, or other commercial heating and drying equipment.

EXAMPLES

General Methods

Molecular Weight.

The molecular weights of the copolymers were determined by gel permeation chromatography (GPC) by use of a liquid chromatograph (Agilent 1090) with both diode array (Agilent) and refractive index (Waters 410) detectors. Gel permeation columns contained polymer-coated, silica packing (Phenomenex P3000, 4000, 6000 columns, plus guard column). Molecular-weight standards were commercial polyaspartates, copolymers of acrylate and acrylamide, a copolymer of acrylate and maleate, polyacrylates, dextrans (Sigma-Aldrich) and polyaspartates prepared in-house. In addition, the molecular weights of specific polymers were measured by mass spectroscopy (matrix-assisted, laser desorption (MALDI MS) with time-of-flight detector), and then used themselves as standards for GPC determinations.

Color.

The color of the copolymers, both as solids and aqueous solutions, was assessed by visual comparison to color standards (ASTM) available from commercial sources. In addition, the ultraviolet and visible light spectra of standard aqueous solutions of the copolymers were compared to indicate the intensity of color development at particular wavelengths.

Molecular Morphology.

Branching versus linearity of the copolymers was assessed in two ways. The first employed an advanced method in atomic force microscopy. The second utilized quantitative titration of the C-terminal, carboxylic endgroups of polysuccinimide molecules. The number of end groups as compared to the known molecular weight of the molecules can provide an indication of the number of branches, as each branch has an end group.

Atomic Force Microscopy.

First, a novel method of atomic force microscopy (AFM) was used to visually inspect the appearance of the molecules at the nanometer and angstrom levels. The method involved first immobilizing the polymers at the surfaces of calcite crystals by allowing the polymers to embed themselves partially at growing crystal surfaces by placement of functional groups of the copolymers into lattice positions of the crystal surface (Sikes et al., 2000). The polymers, so immobilized and held tightly to an atomically flat surface, were then imaged via contact-mode AFM in solution (Digital Instruments, Nanoscope III, Multimode). The visually evident differences between branched versus unbranched molecules were clear.

The AFM was also used to visualize gelled and insoluble particles of polymeric materials at the micron and nanometer levels. In the context of controlled release, this was helpful in correlating dissolution of particles over time with the appearance and increase of flocculation activity.

Infrared Spectroscopy.

The infrared spectra of copolymers were determined by use of an IR spectrophotometer (Perkin Elmer 1600) equipped with attenuated total reflectance. The spectra revealed the characteristic amide and imide peaks, thus indicating the presence or absence of succinimide residues, as well as aspartate, asparagine, and other residues. The spectra also revealed the presence of functional additive groups in derivatized copolymers, in particular the glycosidic ether linkages of polysaccharides.

Residue Ratios Via Assessment of Titratable Groups of Polymer Products.

Quantitative acid-base titrations of the copolymers over the pH range of 7 to 2.5 were made manually by use of digital pipettors. The procedure began with weighing a standard amount of material, typically 100 mg, into a beaker containing distilled water, typically 50 ml. The initial pH was measured and brought to pH 7 by addition of either 1N NaOH or 1N HCl (Fisher Scientific standard reagents and pH buffers). The titration was conducted by recording the volumes of titrant (1N HCl) versus pH from pH 7 to 2.5. The μmoles of NaOH consumed over this range corresponded to the μmoles of titratable groups in the original sample. Controls consisted of titrations of distilled water and standard compounds including reagent grade aspartic acid, purified sodium polyaspartates, purified polyaspartic acids, purified polysuccinimides, and purified polyasparagine (Sigma Chemical). The amount of acid or base that was consumed over this range indicated the amount of titratable groups of aspartic acid per unit weight of the copolymers.

The material was then back-titrated to pH 7 using 1N NaOH, as a comparison and check on the downward titration, then continued to pH 10.0. The solution was warmed to 60 to 65° C. to facilitate the mild, alkaline ring-opening of succinimide residues, if any. Amounts of 1N NaOH were added to maintain the pH at 10.0 until the downward pH drift that accompanies the ring-opening (as OH⁻ molecules are consumed) ceased. This volume also was recorded as an indication of the amount of succinimide residues that had been converted to aspartate residues.

As a more quantitative measurement of the appearance of new aspartate residues in the solution, the downward pH titration was repeated. The pH was adjusted to pH 7 via additions of 1N HCl. The titration was then continued to pH 2.5, again recording the volume of titrant versus pH. The number of μmoles of succinimide residues in a particular polymer product was determined from the difference between the μmoles of HCl needed to titrate from pH 7 to 2.5 after the ring-opening procedure, as compared to the original amount of μmoles of HCl consumed from pH 7 to 2.5 by the initial polymer material.

The number of micromoles of aspartate residues and succinimide residues was next converted to an amount in milligrams. The difference between the original amount of sample and the amount of aspartate and succinimide residues corresponded to the amount of nontitratable mass in the original sample. For the terpolymers of aspartate, asparagine, and succinimide, the mass of nontitratable materials is equivalent to the amount of asparagine residues. In cases in which extra mass of titrant or additives were present in the dried bulk polymer samples, appropriate corrections were made.

Amino Acid Analysis.

The copolymers were hydrolyzed via acid treatment to produce the monomeric constituents. These were then treated to form their phenylthio carbamyl derivatives by use of phenylisothiocyanate. The derivatized amino acids were next separated via reverse-phase, liquid chromatography and identified by comparison to chromatograms of standards of the amino acids, also so treated. This method generated quantitative data of the amino-acid composition of the copolymers.

Examples 1-3. Preparation of Polysuccinimide Starting Materials

Example 1. Preparation of a Low MW (3 to 5 kDa) Moderately Branched Polysuccinimide Via Dry Thermal Polycondensation of Aspartic Acid An amount of 1.0 mole of aspartic acid (133 g, Solutia) spread evenly in a pyrex dish (2.5×10×15 inches) was thermally polymerized in a vacuum oven (30 in Hg) at 220° C. for 4 hours. The resulting polysuccinimide, which was obtained in essentially quantitative yield of 97 g, had a molecular weight of 5 kDa as shown by gel permeation (weight average). It was moderately branched as shown by titration of carboxylate groups, indicating a branch point at roughly 1 in 10 residues. The color of the solid product was light tan. The IR spectrum showed a characteristic imide peak at 1705 cm$^{-1}$ and an amide signal at 1524 cm$^{-1}$, indicative of ring-opened residues, as would occur at branch points. (2949 w, 1705 s, 1524 w, 1390 m, 1359 m, 1287 w, 1258 w, 1212 m, 1162 m)

Example 2. Preparation of Medium MW (Approximately 30 kDa Molecular Weight) Unbranched Polysuccinimide Via Phosphoric or Polyphosphoric Acid-Catalyzed Thermal Polycondensation of Aspartic Acid A mixture of 1.0 mole of aspartic acid (133 g; Sigma-Aldrich) and 40 g polyphosphoric acid (i.e. about 30% by weight of the aspartic acid) was prepared by weighing the polyphosphoric acid onto the aspartic powder in a large pyrex dish. (Phosphoric acid can be used to replace the polyphosphoric acid partially or entirely at this step, essentially at the same weight percent. Polyphosphoric acid, although more expensive, tends to result in products of somewhat larger molecular size and better (lighter) color, and is more effective as a dehydration agent.)

Upon heating at 150° C. for 15 minutes in a forced-air oven, followed by manual stirring with a spatula, and repeating this procedure 3 times, a translucent, homogeneous paste of the catalyst and aspartic acid was produced. This mixture was then polymerized by heating in a vacuum oven at 190° C. for 4 hours. The polymerizing mass tends to rise as the water of condensation is evolved, beginning particularly as the temperature reaches 160° C. To collapse the mass and keep the product more dense, the vacuum was released periodically over the first interval of up to 1 hour. After this, the mass was stable and the vacuum was set at approximately 30 inches of Hg.

The product was converted to fine granules by suspending in water and pulverizing in a blender. The mixture was filtered and the product washed thoroughly with water until the pH of the wash water was greater than 6.0. There was essentially no residual phosphate in the product as shown by spectrophotometric analysis, using the molybdate assay for phosphate. The polysuccinimide product, obtained in nearly quantitative yield, was light cream in color, insoluble in water, and had a gel-permeation (weight average) molecular weight of approximately 30 kDa. The titration data for carboxylic groups indicated the presence of few branch points (less than 1 per 10 residues), as also shown by a lack of the amide peak at 1520 cm$^{-1}$ in the IR spectrum, as would occur if the amide bonds of branch points were present. (IR 3622, 2946, 1704, 1390, 1369, 1297, 1258, 1210, 1159, 633 cm$^{-1}$).

An infrared spectrum of sodium polyaspartate prepared from this polysuccinimide showed the diagnostic amide doublet in the region of 1500-1600 cm$^{-1}$, and carboxylate signals, sharply at 1395 cm$^{-1}$, and broadly in the region of 3200 to 3300 cm$^{-1}$ (IR 3278 s, 1582 s, 1520 s, 1395 s, 1316 w).

Example 3. Preparation of Unbranched Polysuccinimides Having MWs up to 300 kDa, Via Phosphoric and/or Polyphosphoric Acid Saturation of Aspartic Acid Prior to Thermal Polycondensation As carried out conventionally, phosphoric and/or polyphosphoric catalysis of thermal condensation of aspartic acid to produce polysuccinimide typically results in products in a range up to 30 kDa. Sikes (2004, US Appn. Pubn. No. 2004/0072984) taught the production of polysuccinimides in the MW range up to 180,000 and higher via an acid solubilization step during which the aspartic acid powder was completely dissolved in water prior to addition of the polyphosphoric acid catalyst. A composition ready for polymerization was then produced by drying or otherwise removing the water. The method took advantage of the utility of intimately and maximally mixing the polyphosphoric catalyst with the aspartic powder. It has been found that still larger molecules can be produced via the further modification described below.

An amount of 4 g of polyphosphoric acid was weighed into a 250 ml pyrex dish. To this was added just enough water, approximately 5 ml, to cover 13.3 g of aspartic acid powder with no visible layer of water above the level of the aspartic powder (as previously determined). The water plus polyphosphoric acid was stirred for 15 minutes to ensure complete mixing of the catalyst with the water. The 13.3 g of aspartic acid powder was then gently poured into the center of the dish and evenly spread over the bottom of the dish by gently tapping the dish on the surface of the bench. This slurry of aspartic acid powder, catalyst, and water was allowed to soak for 1 hour, then placed in a forced-air oven to dry overnight at 80° C. This resulted in a dried mass of aspartic acid crystals that were evenly coated with polyphosphoric acid catalyst.

The dish was then placed in a vacuum oven and the aspartic acid polymerized at 190° C. under vacuum for 4 hours. The resulting products were polysuccinimides of molecular weights ranging up to 300 kDa, as shown in Table 4.

The polysuccinimides so produced are light, off-white materials. Again, MW's of 180,000 and higher were routinely achieved at 30% catalyst via this method. These polymers have minimal or no branching.

Polysuccinimides of defined MW's ranging from 7,000 and higher were also produced via this approach simply by lowering the catalyst loading. For example, polysuccinimides of MW 10 KDa and 15 KDa were produced at catalyst concentrations of 2% and 3-4% by weight, respectively, of aspartic acid.

For comparison, in some experiments, the amount of water in the dishes was tripled, leaving a clear layer of water above the powder. On drying, this resulted not only in a concentration of the catalyst in a film on the glass surface rather than associated with the aspartic crystals themselves, but also in lower MW of the product polysuccinimides.

TABLE 4

Production of polysuccinimides via thermal condensation of aspartic acid presoaked in polyphosphoric acid catalyst.

| Minimal water required to cover aspartic acid powder used: % polyphosphoric acid by weight of aspartic acid | Molecular weight of the product polysuccinimide, kDa |
| --- | --- |
| 0 | 5 |
| 1 | 8 |
| 2 | 10.5 |
| 3 | 14.5 |
| 10 | 20.5 |
| 15 | 23 |
| 20 | 30 |
| 25 | 160 |
| 30 | 193 |
| 40 | 282 |

| Excess water used: % polyphosphoric acid by weight of aspartic acid | Molecular weight of the product polysuccinimide, kDa |
| --- | --- |
| 4 | 13.6 |
| 5 | 12 |
| 30 | 28 |

Examples 4-8. Production of Oligomeric Copolymers of Aspartate, Asparagine, and Succinimide

Example 4. Production of Very Low MW, Branched Copolymers of Sodium Aspartate and Succinimide, Via Back-Titration of Comonomer Preparation, Followed by Thermal Polycondensation A sample of 19.95 g of aspartic acid (0.15 mole, MW=133 g/mol, equivalent to 0.3 moles of COOH groups) was weighed into a 2-liter beaker containing 100 ml of water with smooth magnetic stirring. To this mixture (pH 3.1) was added 3.75 ml of 10 N NaOH (37.5 mmol) with stirring, raising the pH to 5.0. Residual crystals remained undissolved. Next were added 7.7 ml of concentrated NH$_4$OH (14.8 M, 0.88 g/ml; 114 mmol) with stirring, raising the pH to about 7.5. (Because of its high vapor pressure, aqueous ammonia does not pipette well, making it preferable to weigh in the required amount.)

To this mixture was added 1.05 ml concentrated H$_2$SO$_4$ (36 N, 37.5 meq) with stirring, lowering the pH to about 4.7.

The resulting solution was dried overnight at 120° C., yielding a yellowish glass mixed with some whitish, clear crystals, presumably inorganic sulfates. This comonomeric composition was polymerized at 220° C. for 4 h under vacuum. The product (17.34 g) was light cream-colored to yellowish, much lighter in color than comparable material prepared as above but without the back titration with sulfuric acid. The product was water soluble at 100 mg/50 ml, pH=5.79.

Titration indicated 95 µmol NaAsp (13.11 mg) per 100 mg (16.7%, residue basis: 22% weight basis), 475 µmol succinimide residues (46.07 mg) per 100 mg (83.3% residue basis: 77.8% weight basis). This amounted to a total of 59.8 mg per 100 mg accounted for via titration. The nontitratable weight is assignable to inorganic salt (Na$_2$SO$_4$) and to residues that form aspartyl branch points, which are not titratable.

Example 5. Conversion of the Sodium Aspartate/Succinimide Copolymer of Example 4 to a Copolymer of Sodium/Ammonium Aspartate and Asparagine, by Ring Opening with Ammonium Hydroxide A sample of 15 g of the copoly(NaAsp, Suc) produced in Example 4 was placed in 250 ml water in 500 ml poly bottle. To this was added 25 ml concentrated $NH_4OH$, the bottle capped firmly, then swirled manually, with dissolution in about 5 minutes. The bottle warmed mildly to the touch. The material was poured into a large pyrex dish and dried overnight at 60° C. with forced-air. The yield was 18.206 g. Based on titration of aspartate groups and change in mass, it was estimated that about 60% of succinimide residues were converted to asparagine and about 40% to ammonium aspartate.

Example 6. Conversion of Copoly (Aspartate/Asparagine) of Example 5 to Terpoly(Aspartate/Asparagine/Succinimide)

The copolymer of Example 5 (18.1 g) was dissolved in 100 ml water in a 2-liter beaker, forming a complete solution. The initial pH was 5.61. The solution was titrated to pH 4.0 by addition of 1.85 ml (22.38 mmol) of 12.1 N HCl. This solution was dried overnight at 60° C. in a forced-air oven, then converted to the terpolymer via ring-closing at 170° C. for 3 h under vacuum with rotation of the position of the sample in the oven at 1.5 h. The product (16.232 g) was light amber in color; if temperatures higher than 180° C. were used, the sample tended to darken significantly. The material was mostly soluble at 100 mg/ml, producing a medium yellowish solution, with some insoluble flakes. Based on titration and weight change, residue mole percentages were estimated to be 25% aspartate, 32% asparagine, and 43% succinimide.

Example 7. Production of Very Low MW, Branched Aspartate/Succinimide Copolymers Via an Anion-Blocking Method of Comonomer Preparation, Followed by Thermal Polycondensation A sample of 13.3 g of aspartic acid (0.1 mole, MW=133 g/mol, 200 m(μ)mol of COOH groups) was placed in a 250-ml beaker containing 40 ml of water. Initial pH was 2.99. To this mixture was added 6.75 ml of concentrated $NH_4OH$ (100 mmol) and 3.46 g of $MgSO_4$ (12.5 mmol $Mg^{2+}$, equivalent to 25 mmol of cationic charge, and 25 mmol of anionic charge). Upon drying, this is expected to produce about 75 mmol of Asp as the ammonium salt, which would convert to succinimide upon heating, and 25 mmol as the Mg salt, the other 25 mmol of ammonia having vented to the atmosphere. There would be 25 mmol of aspartate residues having $SO_4^{2-}$ as counterions to the cationic amino groups of the residues. The $Mg^{2+}$ ions upon drying, if occurring as ionic counterions to form salts with the $COO^-$ groups, would block these groups from thermal condensation reaction to form the polymer as reported in the prior art. Analogously, but novel to the present invention, the $SO_4^{2-}$ ions upon drying, if occurring as ionic counterions to form salts with the $NH_4^+$ groups, would block these from reaction during the thermal polymerization step. Hence, the comonomeric composition was dried overnight at 120° C., producing a pale, yellowish glass, then polymerized at 220° C. for 4 h in a vacuum oven, with rotation of the beaker at 2 hours. The product was a pale, cream-colored powder, expected to have a residue ratio of about 1:3 aspartate: succinimide. Titration revealed residue percentages of 27% as Mg aspartate and 73% as succinimide (1:2.7 residue ratio). The molecular weight as shown by gel permeation was approximately 1000 Daltons. The material was partially water soluble, having an initial pH of 4.14.

The procedure was repeated using 2.05 g of $MgSO_4$ heptahydrate (8.33 mmol $Mg^{2+}$ and $SO_4^{2-}$, equivalent to 16.7 mmol each of cations and anions). Upon drying, this is expected to produce about 83.3 mmol of Asp as the ammonium aspartate, with 16.7 mmol as Mg aspartate. In this case, the target upon polymerization was a copolymer of aspartate and succinimide with a 1:5 residue ratio. The product had a residue ratio of about 20% Mg aspartate and 80% succinimide (1:4) and was largely insoluble. The molecular weight as shown by gel permeation was approximately 1500 Daltons.

Repeating the procedure with addition of higher amounts of $MgSO_4$, to target residue ratios in the range of 1:1 to 1:2, were successful in producing the desired copolymers of aspartate and succinimide. In these cases, the copolymers were water soluble, again having molecular weights in the oligomeric range (600 to 1000 Daltons).

Example 8a. Conversion of the Aspartate/Succinimide Copolymers of Example 7 to Aspartate/Asparagine Copolymers, by Ring Opening with $NH_4OH$ Samples of 5 g each of the first and second copoly (aspartate/succinimide) copolymers of Example 7 (ratios of 1:2.7 and 1:4, respectively) were placed in 50 ml $H_2O$ in 500 ml wide-mouth plastic bottles. To effect ring opening, these samples were treated with excess $NH_4OH$ (10 ml of 14.8 M solution), and the solutions were poured into 250 ml pyrex dishes and dried at 80° C. (maximum temperature) overnight in a forced-air oven.

Example 8b. Further Conversion to Aspartate/Asparagine/Succinimide Terpolymers The products of Example 8a were dissolved in 50 ml water in a small beaker, and the solutions were titrated to pH 4 via addition of $H_2SO_4$, transferred to small pyrex dishes, redried at 80° C., and finally converted to the terpolymers via ring-closure at 170° C. for 3 hours under vacuum. Titration revealed aspartate:asparagine:succinimide residue percentages of 28:53:19 for the first terpolymer and 22:60: 18 for the second.

Examples 9-11. Production of Flocculant Materials of Crosslinked Copoly(Aspartate/Asparagine)

Example 9. Production of Aspartate/Asparagine Copolymers Having High Asparagine Content from Polysuccinimides (Examples 1-3)

A sample of 97 g (1 residue mole) of the polysuccinimide of Example 1 (MW 5,000) was slurried in 500 ml water in a plastic bottle and treated with 3 eq $NH_4OH$. The polysuccinimides of Examples 2 and 3 (MW's 30,000 and 180,000 respectively) were treated similarly, with longer times required for reaction and dissolution. The solutions were poured into large pyrex dishes and dried at 80° C. overnight in a forced-air oven. This procedure was found to produce a maximum asparagine content of about 60 mol %.

By repeating the procedure with the NH₄OH addition step carried out at low temperatures, e.g. 2-4° C., higher asparagine content could be attained. In these experiments, the slurried polysuccinimide and the concentrated NH₄OH were precooled prior to mixing. The amount of polysuccinimide was reduced to 0.1 residue mole (9.7 g) and the amount of ammonium hydroxide was also reduced tenfold, to 0.3 moles.

In further experiments, the temperature was lowered to −12° C., or to −20° C., at which point the aqueous ammonia slurry tended to freeze. The reactions were allowed to proceed until the polysuccinimide was fully solubilized, typically within 2 hours. In cases in which the reaction mixture was frozen, the reaction was allowed to proceed for up to 18 hours without full dissolution of the reaction mixture. However, the material was fully soluble upon warming to room temperature.

In all cases, the low-temperature treatments generated higher asparagine content in the copolymer products. With 3-fold excess or higher of ammonia relative to succinimide, at −10 to 2° C. with vigorous stirring, copolymers with >83 mole % asparagine residues were produced, the remainder being ammonium aspartate residues.

Example 10. Production of Flocculant Materials Via Thermal Crosslinking of the Copoly(Aspartate/Asparagine) Polymers of Example 9

Samples of 500 mg of the aspartate/asparagine copolymers of Example 9 were weighed into 100-ml beakers and dissolved in 10 ml water with magnetic stirring. Crosslinkers were added in various amounts to generate residue-to-crosslinker ratios of various amounts; for example, 9:1, 8:1, 7:1, 6:1, 5:1, and 4:1. Typically ratios were on a molar basis although in some instances weight ratios were used. Examples of copolymers and crosslinkers are given in Table 1 above.

The mixtures were dried overnight at 80° C., then heated at 170° C. for 3 h under vacuum. Products were weighed and assessed for solubility and flocculation activity, via the soil assays described in Examples 26-27. Results are summarized in Table 2, above.

Example 11. Production of Flocculant Materials Via Simultaneous Nucleophilic Ring-Opening and Crosslinking of Polysuccinimides The reaction conditions and procedures of Example 9, for production of copolymers of ammonium aspartate and asparagine from polysuccinimides, were followed with the additional inclusion of crosslinker molecules along with the ammonium hydroxide. Accordingly, a sample of polysuccinimide, preferably comprised of high MW, linear molecules (e.g. from Example 3), was slurried in water at 20 g in 100 ml water. The slurry was cooled to 2-4° C., by use of a refrigerated recirculating bath and a water-jacketed glass vessel, and precooled, concentrated ammonium hydroxide (twofold excess) was added, keeping the temperature at 2-4° C. The crosslinker, in a cooled solution of ammonium hydroxide, was added to the precooled slurry of polysuccinimide, and the reaction mixture was then stirred for 2 to 4 hours until a complete solution was formed. Water was removed at 80° C. in a forced-air oven, producing a dried product of lightly crosslinked aspartate/asparagine copolymer.

Example 12a. Activation of Starch Via Aqueous Thermal Treatment in Suspension

1. A sample of 10 g of potato starch (KMC) was slurried in 500 ml of water at room temperature in a 2-liter beaker, itself placed in a water bath. Stirring was provided from above via rheostated motor fit with a spatula. The apparatus was placed on a thermostated hotplate and the temperature raised to 75° C. with continuous monitoring via digital thermistor. As the temperature increased to 60° C., the material began to gel, and upon reaching 70-75° C., it became more translucent. The temperature was held at 75° C. for 1 hour, then quickly reduced to <60° C. by pouring the sample into a large pyrex dish, then allowed to gradually cool further to room temperature. The sample is stable once cooled to <60° C.

2. To assess the activity of the material as a flocculant, soil-vial and soil-cuvette assays (see Examples 26a and 26b, below) were run over the concentration range of 5 to 300 µg/ml. The activated starch was an excellent flocculant in these assays at 30 µg/ml, with measurable activity at 10 µg/ml, decreasing to control levels at 5 µg/ml.

3. Activated starch by itself, although performing well in static assays, did not function well as a soil-retention agent under the dynamic flow conditions of the soil-rill assay. Although the soil particles are formed into large flocs in the presence of activated starch, these flocs are less dense and loosely held together as compared to flocs formed in the presence of copolymers of aspartate/asparagine or acrylate/acrylamide.

4. Potato starch became deactivated by heating in water at temperatures above 85° C. for 1 hour. If so treated at 80° C., it began to lose flocculation activity after 2 hours of heating. Aqueous heat treatment at 70 to 75° C. for 1 to 2 hours was optimal with the mild stirring conditions as described in step 1 above. With vigorous stirring, as may be provided in commercial equipment such as the Littleford reactor (example 25), activation may occur more quickly, for example in 15 to 30 minutes at 70° C.

5. A variety of other starches from several suppliers were also activated as flocculants via aqueous heat treatment. Corn starch and wheat starch required heating in the range of 90-95° C. to become activated, but were deactivated if such heat treatment were extended much over 1 hour.

6. The starches were heat activated at concentrations up to 10% by weight, although concentrations below about 5% were preferred, due to lower viscosity and relative ease of stirring.

7. The flocculation activity of the activated starches in the soil-vial assay increased remarkably with time. The initial activity of an activated starch at 30 µg/ml was roughly equivalent to that of PAM at 10 µg/ml. However, after a few days during which the soil suspension plus additive was incubated on the bench, the activated starch, even at the lower doses, was outperforming 10 µg/ml of PAM. This activity often persisted for several months before beginning to fade.

8. On the other hand, the activated starches were not as effective as PAM as soil-retention agents in the soil-rill assay (Example 27 below). Although the activated starches were able to stabilize the soil in the rill assays at the top near the inflow, they were not able to stabilize the soil for the entire length of the minifurrow.

Example 12b. Activation of Starch by Jet Cooking; Formulations of Starch-Based Flocculants and PAM It is also useful to activate starch and/or starch/PAM combinations via rapid heating methods, e.g. using steam for brief intervals.

Accordingly, slurries of 3.75% by weight each of potato starch, wheat starch, and corn starch, in amounts of about 40 gallons, were prepared in tap water at room temperature. To each was added 0.75% by weight copoly(acrylate, acrylamide) (Cytec A-110 PAM) by smooth and continuous addition over about 30 seconds, with sufficient stirring to quickly disperse the PAM before it began to swell and agglomerate. Stirring was continued for 1 hour or more to allow dissolution of the PAM.

Each starch/PAM preparation was pumped into the reaction chamber of a jet-cooker at approximately 2 liters per minute, with steam set to generate a chamber temperature of 84 to 110° C., depending on the type of starch used. In experiments with potato starch, the jet-cook temperature was 84-88° C., with 84° C. preferred under the conditions used. In experiments with wheat or corn starch, the jet-cook temperature was 100-110° C., again with the lower temperature preferred under the specified conditions. The residence time in the chamber was approximately 2 to 3 minutes. Temperature in the reaction chamber was recorded continuously by thermistor.

Pumping was continuous into and through the reaction chamber, with outflow first to a heat-exchange loop and then into a product reservoir. The product was quickly cooled to 45° C. upon exit from the reaction chamber. Preservatives typically were stirred into the products upon cooling. The temperature in the reservoir was also monitored via digital thermistor thermometer.

The activity of the products as flocculants and soil retention agents were demonstrated by use of the soil-vial, soil-cuvette, and soil-rill assays, described in Examples 26-27 below.

Example 13. Improvement of Starch as a
Flocculant by Grafting of
Aspartate/Asparagine/Succinimide/Terpolymers 1. A sample of 100 mg of potato starch was slurried in 10 ml of water in a 100 ml beaker with smooth magnetic stirring, then heat-activated at 70° C. for 1 hour. At a residue weight of 162 mg per mmol, this formed a colloidal solution with an equivalence of 61.5 mmol of glucose residues.
2. A sample of 200 mg of the very low MW NaAsp/Asn/Suc terpolymer of Example 8b was dissolved in 50 ml water in another 100 ml beaker. This terpolymer had a residue composition per 100 mg of 170:408:190 (22:53:25 residue-mole %) Asp:Asn:Suc residue-μmol per 100 mg.
3. The terpolymer solution was added to the starch colloidal solution with stirring.
4. The mixed solution of starch and the terpolymer was adjusted to pH 11.3 via addition of 10 N NaOH by digital microliter pipette.
5. The nucleophilic ring-opening was allowed to proceed for 30 minutes, then the solution was neutralized to pH 7 with 1 N HCl. At this point, the material had been rendered completely soluble.
6. The sample was assessed as a flocculant via the soil-vial assay (Example 26a), exhibiting some initial activity, with excellent activity developing over a period of 1 week. The activity persisted for several months before fading.
7. A variety of other terpolymers were grafted to starch via this method. The most effective grafted materials utilized the very low MW terpolymers having the highest res-% as asparagine. The larger MW terpolymers were not as readily grafted to starch.
8. The terpolymers with lower res-% as asparagine and correspondingly higher res-% as aspartate exhibited an increasing tendency towards dispersion activity rather than flocculation activity. That is, the soil particles in the soil-vial assay tended to remain as a cloudy suspension rather than settling quickly as compared to control vials with no additives.

Example 14. Improvement of Starch as a
Flocculant by Nucleophilic Derivatization with
Maleamic Acid Via Michael Reaction 1. Potato starch was slurried as 200 mg starch in 10 ml water with smooth magnetic stirring in a 30 ml capped glass bottle placed on a stirplate in a forced-air oven at 70° C. for 2 hours. Given a residue weight of glucose of 162 mg/mmol, there are approximately 1.23 mmol as glucose in 200 mg starch.
2. The pH was adjusted to approximately 12.5 by addition of 10 N NaOH.
3. Next, an equivalent amount of sodium maleamate was added. The sodium maleamate had been prepared from 142 mg of maleamic acid (MW 115.09, 1.23 mmol, Aldrich Chemical) plus 3.77 ml of water and 1.23 ml of 1 N NaOH (1.23 mmol).
4. The pH was adjusted downward with 0.2 to 0.4 ml of 1 N HCl to approximately pH 12, equivalent to 0.01 N NaOH.
5. The reaction was allowed to proceed for up to 3 hours at 70° C., with formation of O-linked starch-maleamate grafts via nucleophilic addition of OH groups of starch across the double bond of sodium maleamate.
6. Controls of both starch and maleamate were also treated as above for later analysis to insure that they did not degrade under the reaction conditions. Gel permeation and infrared analysis showed that the materials are stable for 3 hours under the stated conditions.
7. The samples were cooled to room temperature by placement of the bottles in an ice bath. The materials were then neutralized to pH 7 using 1 N HCl.
8. The maleamate-derivatized starch ("starch-maleamate") was assessed for flocculation activity by use of the soil-vial and soil-rill assays. The materials were excellent flocculants under the static conditions of the soil-vial assay, with increasing activity over the range of 5, 10, and 30 μg of grafted material per ml of soil suspension.
9. The flocculation activity in the soil-vial assay increased remarkably with time. The initial activity of the modified starch at 30 μg/ml was roughly equivalent to that of PAM at 10 μg/ml. However, after a few days during which the soil suspension plus additive was incubated on the bench, the modified starch, even at the low doses, was outperforming PAM at 10 μg/ml. This activity persisted for several months before beginning to fade.
10. On the other hand, like the activated, underivatized starch, the maleamate-modified starch was not as effective as PAM in soil-retention, as assessed via the soil-rill assay (Example 27). In this case, however, although the materials tended to perform poorly at the inflow of the rill, they were able to stabilize the soil toward the end of the rill (where each run of the rill was less than 10 minutes in duration).

Example 15. Starch-Maleate Dispersants Produced
Via Nucleophilic Reaction of Maleic Anhydride or
Maleic Acid with Starch The reaction conditions of example 14 were followed, substituting maleic anhydride or maleic acid for maleamic acid. The grafted compositions so produced exhibited marked dispersive activity rather than flocculation activity.

That is, when assessed via the soil-vial assays, the soil particles in the presence of starch-maleic grafts (starch-maleate materials) settled much more slowly than occurred in control treatments with no additives.

It was also possible to simultaneously graft both maleamic acid and maleic acid to starch. This produced compositions having attenuated dispersive or flocculation activity, depending on the relative amounts of maleamate- or maleate-substituted glucose residues in the resultant starch-grafted compositions.

Examples 16-17. Formulations of Copolymers, Activated Starch, and Starch-Maleamate as Flocculants and Soil Retention Agents Example 16. Formulation of Activated Starch and PAM 1. Potato starch was activated as exemplified above at 75° C. for 1 hour, using a 5% by weight suspension in tap water.
2. A commercial sample of PAM (Cytec Superfloc A-836, MW ~18 million, ~82 res-% acrylamide) was dissolved in tap water at 1% by weight.
3. A 1:1 composition of these components was prepared by mixing equal volumes of the activated starch and PAM preparations, giving a weight ratio of 2.5% activated starch to 0.5% of PAM, designated as a 10:2 (or 5:1) preparation.
4. A variety of other mixtures were similarly prepared, at ratios ranging from 10:0.5 to 10:5 activated starch:PAM.
5. These formulations were assessed for flocculation activity via the soil-vial, soil-cuvette, and soil-rill assays (Examples 26-27). In addition, field assessments in both furrow-irrigation and spray irrigation (Example 30) were run in some cases.
6. Results for the synergistic formulations of activated starch and PAM were compared to control treatments with no additive, with activated starch alone, and PAM alone.
7. In each of the assays in the cases above, including conditions of turbulent flow of the soil-rill assay, the synergistic formulations performed very well at doses at which the activated starch alone or the PAM alone exhibited little or no activity. In the field work, in general, the synergistic formulation of activated starch and PAM at ratios of 10:1 and higher performed at parity to PAM at equivalent doses, even though the actual dose of PAM was up to ten-fold lower in the synergistic formulation.
8. Activated starch was also formulated with PAM over a range of other doses and ratios up to 100 ppm and 30:1. Flocculation activity in the various assays was good at doses of 5 to 30 ppm, using ratios up to 30:1 of activated starch:PAM.
9. It was also possible to activate the starch in the presence of pre-solubilized PAM by forming a slurry of the starch in the dissolved PAM at lower temperature (less than 50 to 55° C.), then to raise the temperature for heat activation of the starch as above.
10. Similarly, it was possible to first form a suspension/slurry of starch followed by rapid introduction of undissolved PAM with vigorous stirring at lower temperatures, followed by stirring of the mixture sufficiently for long enough to dissolve the PAM, still keeping the temperature below the gelling point of the starch. In this preferred method of premixing the components, it is necessary that the PAM is well dispersed in the fluid over an interval of about 30 seconds. This allows the PAM particles to become dispersed before the viscosity of the fluid increases too much as the PAM dissolves. The PAM particles then dissolve with further stirring and processing of the starch/PAM formulation. If these conditions of vigorous stirring and rapid dispersion are not present, the PAM particles begin to solubilize at their surfaces, which become sticky, quickly adhere to one another and to dispersed starch particles as well, and form into essentially insoluble larger agglomerations that are not further processable.

Next, the temperature was raised to heat-activate the starch. In either arrangement of this example (steps 9 and 10), the activated starch-PAM formulations exhibited significant synergism as flocculants and soil-retention agents. However, reiterating, one should ensure that the PAM is dissolved, or at least well dispersed, prior to heat treatment for activation of the starch, to avoid the formation of gelled agglomerations of undissolved PAM particles and starch particles, singly or in combination. Both PAM particles and starch particles tend to form such relatively insoluble, partially gelled clumps when heated too fast with insufficient stirring.

Example 17. Formulation of Maleamate-Modified Starch and PAM

1. The maleamate-modified starch of Example 14 was formulated with commercial PAM by mixing separate stock solutions. Typical ratios of the active agents ranged from 10:0.5 to 10:5 of maleamate-modified starch to PAM.
2. These formulations were assessed for flocculation activity via the soil-vial and soil-rill assays (Examples 26-27).
3. Results for these synergistic formulations of starch-maleamate and PAM were compared to control treatments with no additive, with starch-maleamate alone, and with PAM alone.
4. In each of the assays in the cases above, including the conditions of turbulent flow of the soil-rill assay (to assess soil retention), this formulation performed very well at doses at which the control treatments exhibited little or no flocculation activity. Moreover, this formulation exhibited a fractional improvement (i.e. 25 to 50%) relative to the activated starch:PAM formulation at equivalent doses.

Example 18. Formulations of Activated Starch, Starch-Maleamate, and PAM as Soil-Retention Agents 1. The activated starch of Example 12a and the starch-maleamate of Example 14 were formulated with commercial PAM by mixing separate stock solutions. Typical ratios of the active agents as activated starch:starch-maleamate:PAM ranged from 5:5:1 to 10:10:1.
2. These formulations were assessed for flocculation activity via the soil-vial and soil-rill assays (Examples 26-27).
3. Results for these 3-part, synergistic formulations of activated starch, starch-maleamate, and PAM were compared to control treatments with no additive, with activated starch alone, with starch-maleamate alone, with a mixture of activated starch and starch-maleamate, and with PAM alone.
4. In each of the assays in the cases above, including the conditions of turbulent flow of the soil-rill assay (to assess soil retention), the 3-part synergistic formulations performed very well at doses at which the control treatments exhibited little or no flocculation activity. Moreover, the 3-part formulation at actives ratios in the range of 5:5:1 to 10:10:1 of activated starch, starch-maleamate, and PAM in general exhibited a two-fold improvement in performance relative to the activated starch:PAM synergistic formulation at an equivalent dose (that is, for example, at a 3-part dose of 1 ppm performed at parity to a 2-part dose at 2 ppm).

Example 19. Formulations of Activated Starch, PAM, and Starch-Maleamate as Water-Infiltration Agents Representative materials of Examples 15, 16, and 17 were evaluated as water-infiltration agents by use of the static and dynamic infiltration assays (Examples 28a-b), and also in field assessments. These materials clearly promoted water infiltration in each of these assessments, with increases in the range of 10 to 20% relative to rates of infiltration in control treatments. As discussed above, PAM alone showed little or no effect on water infiltration in these tests.

Example 20. Preparation of the Above Formulations as Dried Products

Samples of 50 ml of a 2% formulation of activated starch and PAM (5:1) were treated overnight and over periods of several days in 250 ml dishes at temperatures ranging from 60 to 120° C. in a forced-air oven. About 80° C. was found to be an optimal temperature; lower temperatures produced insufficient drying, and materials dried at higher temperatures (>90° C.) were sometimes difficult to reconstitute. The material dried at 80° C. retained up to 30% as water, based on the weight analysis, but it could be handled as a nonsticky "dry" material, and it could be rehydrated at room temperature for preparation of new stock solutions, or added "dry" in the assays. For example, to run a rill-assay (Example 27), it was possible to simply sprinkle an amount at the point of inflow equivalent to the amount that would be applied in solution, then to flow tap water down the rill, generally with equivalent success in stabilizing the soil and minimizing the erosion.

Materials may also be dried via other methods, such as spray-drying, freeze-drying, or solvent extraction.

Example 21. Other Dry Formulations of Starch-Based Flocculants

It is also possible to blend dry preparations of commercially available, cold-water-soluble starches with PAM as a dry product for later preparation of aqueous stocks of the synergistic formulations for use in soil-retention, water-conservation, water-clarification, and dust-control. The so-called, water-soluble starches are typically prepared as pre-gelled materials via aqueous heating using a drum drier, jet cooker plus spray drier, or other commercial heating and drying equipment. If the starches so-produced retain sufficient molecular size, when dissolved with PAM, or provided as a separate aqueous stock solution with aqueous PAM, a formulation that functions well in soil-retention, water-conservation, water-clarification, and dust-control is produced. Such formulations were assessed via the soil-retention, water-clarification, and water-infiltration methods of the present invention, including field assessments. The preferred formulations from the dry blends of starch and PAM performed at parity with the formulations of Examples 15 through 18.

Example 22. Utility of Starch-Based Flocculants and Other Polysaccharide-Containing Materials as Dust-Control Agents Each of the flocculants and soil-retention agents of the present invention as detailed above were assessed as potential dust-control agents via the dust-control assay. Each of these materials and formulations of theses materials performed better than PAM in this assay including activated starch on its own, starch-maleamate grafts on their own, and each of the starch-based formulations as indicated in the above examples. In addition, a number of commercial polysaccharides performed very well in this assay, exhibiting marked improvements relative to PAM alone in direct comparisons on an equivalent weight basis. Examples of such polysaccharides, obtained from commercial suppliers (Fluka, Sigma-Aldrich), included agar, carrageenan, chitosan, carboxymethyl cellulose, guar gum, hydroxyethyl cellulose, gum Arabic, pectin, and xanthan gum.

Example 23. Utility of Starch-Based Flocculants and Other Polysaccharide-Containing Materials in Treatment of Process Waters Generated in Mining Operations In mining of oil-sands, large volumes of hydrocarbon- and bitumen-enriched process water are generated that must be clarified and purified prior to re-use or return to the environment. The compositions of the present invention exhibited excellent utility in this regard. For example, process water from oil-sand mining operations was obtained and treated with an activated-starch/PAM formulation at 30 µg/ml. The process water in its untreated state is a darkly-colored amber, contains significant bitumen particulates, and has a definite gasoline-like odor. Within seconds following treatment with the composition of the present invention, the particulates and emulsified petrochemicals form into large flocs in a surface layer. These can be easily separated from the lower water layer by skimming. The aqueous lower layer, which is much larger than the surface layer, quickly clarifies and within minutes approaches a water-white appearance.

Treatment with the flocculating agents can be enhanced by concomitant adjustment of the process water to 0.1 to 3 mM acid, to lower the pH in the range of pH 3. Inclusion of inorganic salts such as aluminum or ferric sulfate, at a final dilution of about 0.1 to 3 mM, along with the compounds of the present invention and the low pH treatment, provides an additional benefit in clarifying the process water. If desired, any residual color in the water layer can be further clarified via addition of small amounts of activated carbon.

For further examples of this utility, see Examples 31-38 below.

Example 24. Preservation and Stability of the Starch-Based Flocculants, Polyamino Acid Flocculants, and Biopolymer-Based Dust-Control Agents Samples of the starch-containing formulations, if prepared with clean vessels and nonsterile tap water, were stable for 1 to 2 weeks at room temperature, but often began to exhibit biological contamination after that. Light microscopic examination revealed the presence of both bacteria and fungi, and often both, in various samples as time progressed.

It was possible to prevent microbial growth in the aqueous formulations of the samples for up to several months at room temperature by addition of commercial preservatives, such as benzoates, sorbates, and isothiazolinones, at doses recommended by commercial suppliers of these agents (e.g., in the range of 0.1% to 0.6% by product weight for the benzoates and sorbates, and 6 to 15 ppm for the isothiazolinones). In some cases, for example with addition of potassium sorbate to the aqueous product formulations, the viscosity of the starch-based products was noticeably lessened, improving the ease of handling and metering of the products in agricultural applications. The isothiazolinones were generally the most effective as preservatives.

In addition, it is useful to keep the samples sealed to the atmosphere prior to use, to minimize the interaction of oxygen with the flocculant molecules and formulations.

Example 25. Lowered Viscosity and Increased % Solids of Flocculant Formulations Via Addition of Inorganic Salts In the absence of viscosity modifiers, the % solids of the starch/PAM flocculant materials are limited in a practical sense, due to the high viscosity of the formulations at 5 wt % or higher. It is possible to decrease the viscosity, thereby enabling use of higher % solids of the flocculant formulations, by addition of inorganic salts such as calcium chloride and ammonium sulfate, among others. The inorganic salts may also be added to the make-up water before addition of the starch and PAM, which are then heat-activated.

To illustrate this effect, a formulation of 15 liters of activated potato starch and PAM in a weight ratio of 3.75% starch:0.75% PAM (5:1) was prepared. The starch was first slurried in tap water, followed by rapid addition of the PAM with concurrent vortexing. This starch/PAM premix was then poured a water-jacketed, 20-liter Littleford reactor. Heat was provided to the reactor via a recirculating bath set to 90° C. to produce an internal target temperature reached 70-73° C., which was held at this range for about one hour.

The internal temperature was then lowered below 40° C. within minutes by circulation of cool tap water to the water jacket. Preservatives were added, and the flocculant composition was transferred into a 5-gallon carboy. Subsamples of this material were then taken for viscosity measurements.

Inorganic salts added at various doses to selected subsamples were shown to reduce viscosity. For example, addition of 5 g of $CaCl_2$ dihydrate to 80 g of a 4.5% starch/PAM formulation reduced the observed Brookfield viscosity at 100 rpm from 750 to about 500 centipoise, a reduction of approximately 33%. The addition of calcium, or other multivalent cations, may also result in increased flocculation activity.

Figure 6:
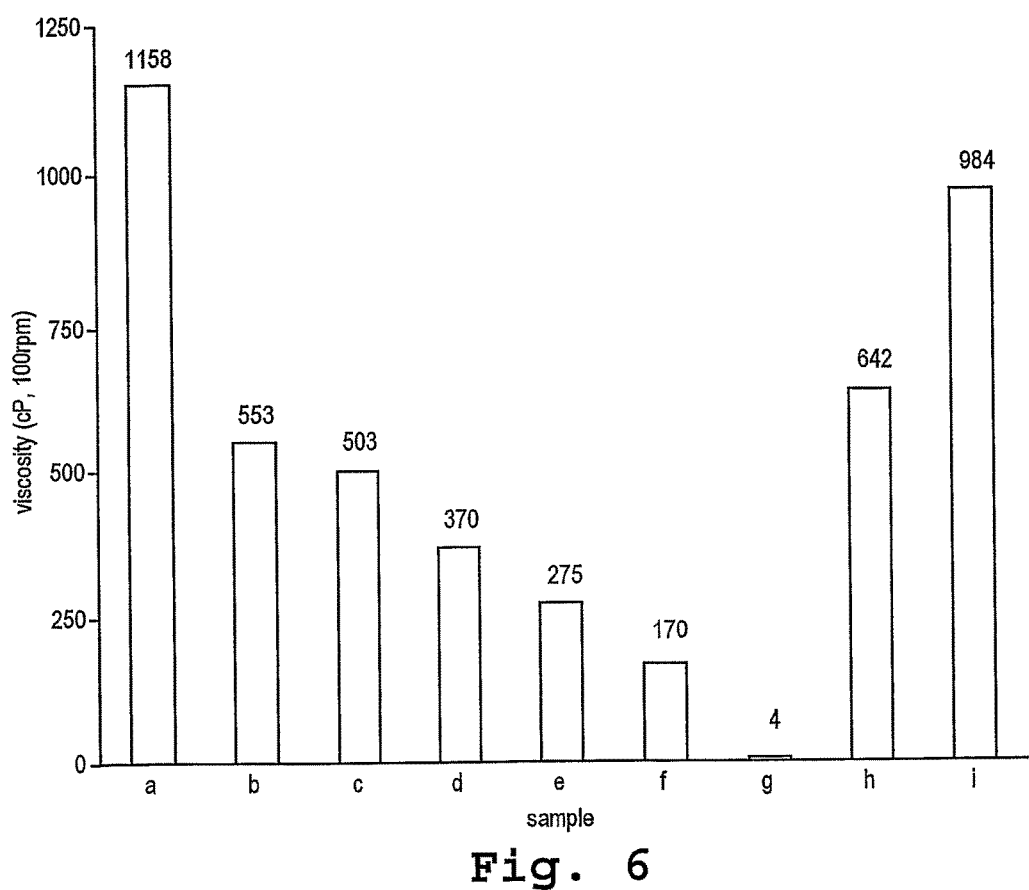
FIG. 6. Effect of ammonium sulfate (($NH_4$)$_2SO_4$) concentration on viscosity of an activated starch/PAM formulation. ($NH_4$)$_2SO_4$ concentrations are given as % by weight of the total aqueous starch/PAM formulation (e.g., PL 4.5% composed of 3.75% by weight activated starch and 0.75% by weight PAM in water).

In a further experiment, increasing amounts of ammonium sulfate were added to the in the make-up water in the preparation of activated starch/PAM products. The effect on viscosity is shown in FIG. 6.

At 15% by weight $(NH_4)_2SO_4$, the constituents of the sample formulations precipitated with time; that is, within a week, about the upper ⅓ of the volume of the samples became substantially clarified as a hazy supernatant layer. This effect was also observed to some extent in the samples containing 5% by weight $(NH_4)_2SO_4$.

At 50% by weight $(NH_4)_2SO_4$, the formulation is prepared as an opaque emulsion; however, within a few minutes, the activated starch and PAM (of the PL 4.5% formulation) precipitated almost in their entirety; hence the very low viscosity, approaching that of water.

Although these low-viscosity formulations are suspensions and slurries rather than solutions, they have utility nonetheless in providing an aqueous preparation of starch/PAM formulations of relatively high % actives. These preparations can be stirred, poured, and pumped and do not contain the insoluble, bulky, partially gelled particles that typically occur when mixing and/or heating relatively high concentrations of PAM and starch without the additives as described herein.

The compositions of the samples and observed viscosities at 100 rpm, in centipoise, are as follows. "PL 4.5%" refers to a composition of activated potato starch and PAM in a weight ratio of 3.75% starch:0.75% PAM, as described above.

| | |
|---|---|
| A) PL 4.5% | 1158 |
| B) PL 4.5%, 5% $(NH_4)_2SO_4$ | 553 |
| C) PL 4.5%, 10% $(NH_4)_2SO_4$ | 503 |
| D) PL 4.5%, 15% $(NH_4)_2SO_4$ | 370 |
| E) PL 4.5%, 20% $(NH_4)_2SO_4$ | 275 |
| F) PL 4.5%, 25% $(NH_4)_2SO_4$ | 170 |
| G) PL 4.5%, 50% $(NH_4)_2SO_4$ | 4 |
| H) PL 7.5%, 15% $(NH_4)_2SO_4$ | 642 |
| I) PL 10.0%, 15% $(NH_4)_2SO_4$ | 984 |
| J) PL 7.5% | 2500 |

Examples 26-28. Soil-Flocculation and Soil-Retention Assays

Soil was obtained from the US Department of Agriculture, Agriculture Research Service from a test site in Idaho so that lab assessments matched a soil type later encountered in some of the field trials. In addition soil was assessed from a number of sites in the California valleys and from several sites around Eugene, Oreg. Soil types were selected to encompass sandy, clay-enriched, and organic enriched soils, as well as soil types that were intermediate in their composition.

Example 26a. Soil-Vial Assay

The soil-vial flocculation assay involved suspension of a soil sample in distilled water in the presence or absence of the additives at different doses. The water contained divalent cations at 0.1 molar (calcium and/or magnesium) because the cationic content has been shown as a significant variable in flocculation activity (Dontsova and Norton, 2001). In general, at least some cationic content is useful in promoting flocculation.

Although a variety of arrangements are possible, routine measurements involved a soil sample of 25 mg placed in 10 ml of 0.1 M $CaCl_2$ in a 20 ml vial. The soil-vial was then vortexed (Vortex Genie 2, VWR Scientific) at high speed for 10 seconds to standardize the initial particle distribution and turbidity. The experimental polymer sample was then pipetted into the vial from a stock solution. A typical effective dose of additive was 10 μg/ml (ppm), with dosing often ranged from 1 to 300 μg/ml. The soil suspension was stirred gently by manually filling and draining a 3-ml bulb pipettor (Fisher Scientific) twice, then allowed to settle for 3 minutes.

For visual assessment of settling, the soil suspension was gently swirled manually then placed in a light field for inspection of settling of particles and clarification of the supernatant. This permitted a rapid assessment of flocculation activity (soil suspensions in the vials clarify quickly) or dispersion activity (soil suspensions in the vials clarify slowly) as compared to control vials with zero additive or with specific amounts of commercial PAM. In the case of PAM-treated soil-vials or treatments with promising experimental flocculants, the results are obvious in a matter of seconds even via such visual inspection.

Example 26b. Soil-Cuvette Assay

To quantify flocculation activity in the soil-vial assay, 2 ml subsamples of soil plus fluid as prepared above were taken from the vials by digital pipettor. Next, the 2 ml samples of the soil suspension were gently pipetted into a polystyrene cuvette with 1 cm path length (Brandtech UV). Absorbance at 400 nm (other wavelengths can also be used) was recorded quickly at 3 seconds then at 10 second intervals over a total of 180 seconds via the kinetics program of a spectrophotometer (Spectronic Genesys 5). Decrease in light scattering by the suspended soil particles versus time occurred as the fluid clarified. Higher rates and total amount of decrease corresponded to increased flocculation activity accompanied by more rapid clarification of the fluid. Representative results from use of the soil-cuvette assay, for formulations containing PAM and/or activated starch, are shown in FIG. 1 and described in Section V.A above.

Example 27. Soil-Rill Assay

The soil-vial and soil-cuvette assays, above, are helpful for detecting flocculation activity under the static conditions that occur after the initial swirling or pipetting of the samples. In the case of soil-retention agents, flocculation activity in itself is required, but in addition the flocs or particles that form must be stable enough and dense enough to withstand conditions of fluid flow such as occur during furrow irrigation and the dynamics of droplet impact during spray irrigation.

To further assess the potential utility of candidate soil-retention agents, a lab-scale simulation of furrow irrigation was used. To do this, devices termed minifurrows (soil plus holder) were constructed for use on the bench top. Once the minifurrow was set on a slope and provided with a fluid flow, the construct was termed a soil rill (minifurrow plus small stream).

The lab minifurrows were constructed in 6-feet lengths of polyethylene half-cylinders that were attached to strips of wooden molding via Velcro adhesive tapes. The polyethylene furrows were cut from pipe insulation obtained from local building suppliers. At the outflow end, a polyethylene spout to promote smooth and uniform outflow was cut from a plastic weighing dish and inserted into a slit cut into the terminal edge of the minifurrow.

Preparation and placement of the soil. Soil (typically 1 to 5 kg) was spread into large pyrex dish(es) and dried at 90° C. overnight. The soil was next ground through 20 mesh using a Wiley mill to standardized the particle size. Then, 200 g samples of the soil were sealed in plastic bags to minimize uptake of moisture from the air. This was useful in lowering variability of erosion measurements.

To prepare a minifurrow, samples of 200 g of the soil were spread evenly over the length of a minifurrow, leaving an uncovered space of approximately 1 inch at the outflow end. This small zone provided a space useful for newly-forming flocs of soil particles to settle. Otherwise, these nascent flocs, owing to a lack of time and region for settling, would flow directly into the collection vial, obscuring results. Next a piece of ¾ inch PVC pipe was laid in the furrow and gently rolled by hand to form the soil into a homogenous layer having a shallow concave surface to promote direct flow of the fluid down the center of the furrow.

The minifurrow was then placed in a holder constructed of foam-core board to provide a defined slope. In experiments, the slopes were set between 2 and 30 degrees, with 10 degrees used in most of the measurements. By comparison, slopes on actual fields range from about 2 degrees to very little slope at all, sometimes adjusted to a fractional degree via laser-leveling technology. Hence, the elevated slope in the soil-rill assay was selected to provide a rigorous test of candidate soil-retention agents.

The soil rill. With the minifurrow so prepared and set on an incline, the final step was to introduce a flow. Water (local tap water) was provided to the minifurrow through Silichem™ tubing set in a holder at the top so that the flow began dropwise at the upper center of the packed soil. The water was pumped at varying rates, typically 20 ml/minute for the 10 degree incline, via a peristaltic pump (Cole Parmer). A set volume of water, usually 250 to 300 ml in a beaker, with and without additives was provided as the reservoir for each experiment.

Figure 7:
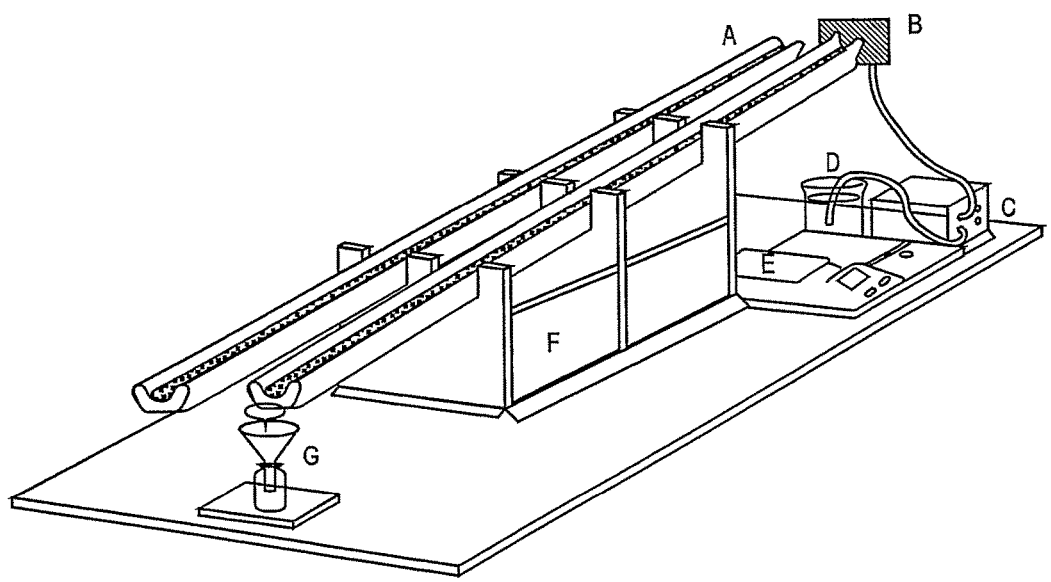
FIG. 7. Schematic of the minifurrow apparatus containing 200 g of soil. Upper image: A. Polyethylene furrow (6 ft) attached to wooden support. B. Inflow holder (foam core) with silicone tubing. C. Peristaltic pump. D. Reservoir on a magnetic stirplate. E. Toploading balance. F. Inclined holder (foam core) set at 10 degrees. G. Outflow holder with funnel and 20-ml vial.

As the water ran down the minifurrow, observations were made visually such as stability of the soil at the point of inflow, tendency to form channels along the rill, stability of the soil along the rill, presence or absence of floc deposits along the rill, and the like. A 20-ml vial with funnel was placed below the outflow spout and the first 20 ml of outflow were collected. The duration of an erosion experiment of this type typically ranged from 8 to 10 minutes. The time until first outflow was recorded for each experiment. Representative results are described in Section V.B above. The apparatus is illustrated in FIG. 7.

Examples 28a-b. Water Infiltration Assays

The agents of the present invention are novel not only in their composition and performance in soil-retention but also in their ability to promote uptake of water by the soil. This property was assessed via two laboratory assays, then verified via field measurements.

The first laboratory assay involves measurement of infiltration of water into soil samples under essentially static conditions as the water percolates into soil that was placed in clear, acrylic cylinders. This method is termed the static infiltration assay.

The second laboratory assay is designed to measure infiltration of water under more dynamic conditions of fluid flow, as the water was pumped down clear, acrylic rills containing loosely packed soil. This method is termed the infiltration plexirill.

Example 28a. Static Infiltration Assay

Clear acrylic tubing of 1 inch inner diameter was obtained from a local supplier and cut into segments ranging from 1 to 3 feet. Soil samples of various types, ranging from local soils to soils obtained at experimental sites in Idaho and California, were dried at 90° C. Samples of these in amounts of 200 g were then poured using a funnel into the cylinders. The bottoms of the cylinders were sealed with filter paper and tape to keep the soil in while allowing air and water to flow out.

A reservoir for infiltration of water and additives was prepared in advance by adding 65 ml of tap water plus 5 g of the soil used to form the column in the cylinder. The soil was gently slurried into the water via smooth magnetic stirring. Candidate additives were next dosed into the water-plus-soil suspension via pipetting from stock solutions to yield a treatment in the range of 10 µg/ml. The additives were thus added as a component of a flocced soil preparation, mimicking the carriage of soil particles along a furrow by the fluid phase.

The water-plus-soil preparations were pipetted onto the surface of the soil in increments of 5 ml at a rate sufficient to maintain a fluid layer of 10 mm. A total of 60 ml of fluid was introduced to the upper surface of soil in the cylinder in this manner. Movement of the water into the column of soil was followed visually, while recording depth of infiltration versus time as well as time of first outflow and total volume of outflow.

Figure 9:
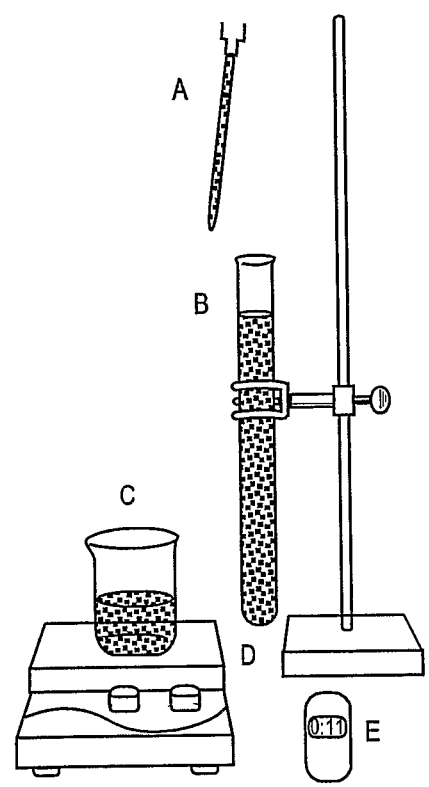
FIG. 9. Schematic of the static water-infiltration apparatus. A. 5-ml pipettor for addition of the water plus soil suspension, the first 5 ml just having been added. B. Clear acrylic tube, 1 inch inner diameter, 12 inches height, containing 195 g of soil. C. Reservoir of water, containing 5 g of soil, on magnetic stirplate. D. Outflow, having filter paper taped to the column to hold the soil in place. E. Stop watch.

Some representative results that illustrate the improved infiltration of water using the compositions of the present invention are shown above in FIG. 2 and described in Section V.C. A schematic of the apparatus is shown in FIG. 9.

Example 28b. Dynamic Infiltration Assay

A transparent "minifurrow" was constructed from clear acrylic materials. The dimensions were 6 feet in length, 6 inches in height, and 1-inch inner width. The acrylic sheets used to construct the device were ¼ inch thick and very high transparency. The ends were configured to slide up and down to allow outflow at the lower end of the rill, and also for ease of emptying the wet soil from the apparatus at the end of an experiment.

To set up an experiment, 8 kilograms of dried soil were added to the plexirill by use of a funnel. A furrow was set into the surface by pressing a ½ inch dowel into the soil. The furrow was placed in a holder to provide an incline at 10 degrees. A peristaltic pump (Cole Parmer) was used to provide a flow to the top of the furrow at a rate of 75 ml/minute from a 2-gallon reservoir. Markings were drawn onto one side of the plexirill to indicate the lateral spacing at 10-cm increments and depth in 1 cm increments to a total depth of 15 cm.

During an experiment, measurements at minimum were recorded versus time as the flow passed each lateral mark of 10 cm and the depth of infiltration at that point. Typically the timing of other points of infiltration according to the characteristics of a particular treatment were recorded as well. Other data included the time and total amount of fluid applied to the furrow prior to first outflow, and also the rate of outflow at intervals until such time that the rate of inflow and rate of outflow equalized.

Figure 10:
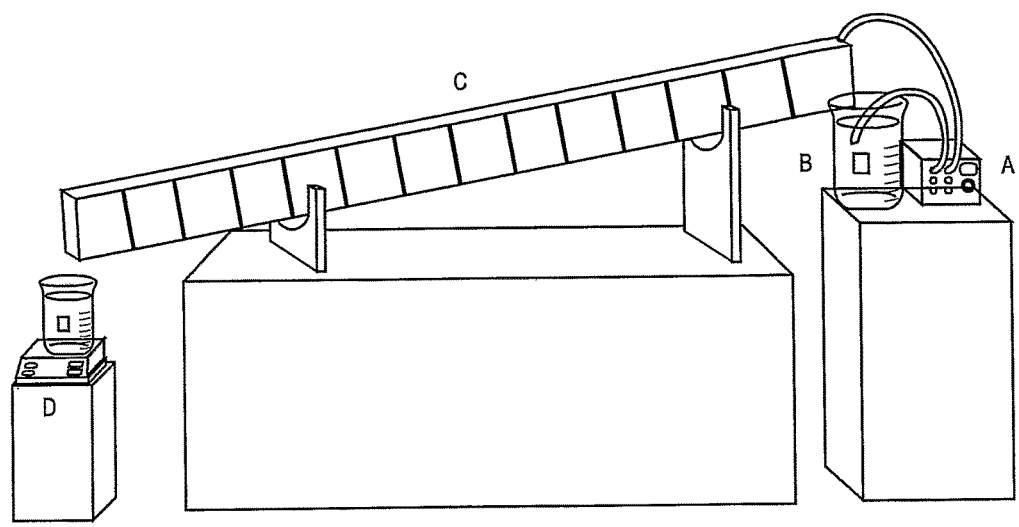
FIG. 10. Schematic of the dynamic water-infiltration apparatus, the infiltration plexirill. A. Peristaltic pump. B. Reservoir. C. Clear acrylic furrow, 6 ft length, 6 inches depth, 1 inch inner width, plus 8 kg soil. D. Receiving vessel plus toploading balance. (See Example 28)

Differences in infiltration between rills treated with effective infiltration agents and control treatments having no additives were easily observed via these measurements. Some representative comparisons are shown in FIGS. 3-5 and discussed in Section V.C above. A drawing of the apparatus is shown in FIG. 10.

Example 29. Dust-Control Assay

This assay also involved a suspension of a soil sample in 0.1 M $CaCl_2$ in the presence or absence of additives at different doses. In this case, routine measurements involved a soil sample of 25 mg placed in 2 ml of 0.1 M $CaCl_2$ in a 20 ml vial, enough fluid to cover the soil completely. The experimental polymer sample was then pipetted into the vial from a stock solution in amounts ranging from a total of 10 micrograms to 3 milligrams. The soil suspension was stirred gently by swirling manually. The vial was then uncapped and placed in a forced-air oven at 80° C. overnight for complete drying. This procedure mimicked the spraying and drying cycle of a dust control agent sprayed onto a dusty surface. Upon drying, the soil, now adhering to the glass surface, was covered with 10 ml of 0.1 M $CaCl_2$ or tap water.

The vial was next vortexed for 5 seconds at high speed, then turbidity of the fluid and settling of the soil particles were assessed as a measure of the stabilization of the soil surface by the additive. Results were compared to those for control treatment with no additives and with PAM.

An effective dust-control additive stabilized the soil very well under these conditions, resulting in clear or nearly clear fluid layers after vortexing. If there were turbid layers in the treated samples after vortexing, the fluids became clarified by settling of the soil particles within seconds. By comparison, the no-additive controls had turbid fluids that clarified slowly. The PAM-alone treatments, at a dose of 100 μg, routinely produced turbid fluids that clarified quickly but more slowly than those of effective dust control additives.

Example 30. Field Experiments in Agricultural Settings

Once a candidate molecule or formulation had shown promising performance at parity or better to commercial PAM as a flocculant and soil-erosion agent, and in a number of instances as an water-infiltration agent, arrangements were made for testing in actual furrow and spray irrigations on agricultural fields. Test sites were in Idaho and California. Comparisons of experimental results were made in side-by-side assessments relative to control treatments with no additives and with commercial PAM. In furrow irrigation, typical flows ranged in general from 5 to 7 gallons per minute and up to 12 gallons per minute. Furrows typically ranged from 300 to 600 feet, but were up to ¼ mile in length in some cases. Dosing typically was between 1 and 30 ppm of active agents. In spray irrigation, typical applications were 2 to 3 pounds of active agents injected into 0.06 acre-foot of water per acre using standard irrigation application equipment. Results are discussed in Section V.D above.

Examples 31-38. Clarification of Process Waters from Oil-Sands Mining

Example 31. Preparation of Exemplary Anionic Flocculant Formula

The formula was prepared at 1.4% actives by weight in water (i.e. 14 g polymer per 1000 g), plus 15 ppm preservative, as follows.

A 1% aqueous wheat starch formulation was prepared by adding 10 g of wheat starch (MGP Midsol, a native wheat starch from Midwest Grain Products) to 986 g of distilled water. The starch formulation was heat-activated at 95° C. for 1.5 h with stirring; the temperature was monitored and the slurry/emulsion kept from boiling and scalding. A viscous, partially solubilized, partly nanophased aqueous preparation of activated starch was produced. After cooling the mixture, the weight lost as vapor during heating was restored by addition of water.

To this preparation was added 4 g of anionic PAM (80:20 acrylamide/acrylate copolymer; Floerger AN 923 VHM; MW approx. 15 million Da) to give a ratio of 5:2 activated starch:PAM. The PAM was stirred in quickly over an interval of 30 seconds followed by vigorous mixing by use of a hand-held mixer for 10 to 15 minutes. The preparation was allowed to further dissolve with smooth magnetic stirring overnight. A preservative (1 ml of a 1.5% commercial isothiazolinone preservative) was also added.

Example 32. Small Scale Assays of High Temperature Oil-Sands Process Water Clarification Using Anionic Flocculant Formula The stock solution prepared in Example 31 (14 mg actives/g) was diluted by combining 1 g with 13 g water, resulting in a secondary stock solution of 1 mg actives per g.

Glass vials containing 10 ml of oil-sands process water, obtained from an oil-sands plant in Canada, were preheated to 95° C. in a forced air oven. To these samples were added up to 80 µl of 1N $H_3PO_4$ as needed to bring the pH to ~3.0. (Other acids that were tried, e.g. HCl, $HNO_3$, $H_2SO_4$, yielded the same overall results.) The amount of acid required for this adjustment varies, depending on the % solids and characteristics of the experimental water. The beneficial effect of lowering the pH is even more marked at lower values, in the range of pH 2.0 to 3.0, but values above about pH 3.8 proved less effective.

To each vial was added 300 µg of secondary stock solution, to give a dose of 30 ppm actives. The vials were swirled gently, and the contents were then allowed to coagulate for ~1 min. The vials were again swirled gently, to allow the agglomeration to form and rise.

The lower aqueous phase was seen to be clear and substantially lighter in color. The upper solids phase floated rapidly to the surface upon subsequent stirring.

Performance of the product was also assessed in combination with polyEpi/DMA (for example, Floerger FL 3249 or Baker Petrolite BPW 76355) over a range of concentrations of 10 to 100 ppm actives. However, due to interaction between the positive and negatively charged formulations, the performance of the starch/PAM flocculant formula alone was superior in these tests to an equivalent total amount of the starch/PAM flocculent formula plus polyEpi/DMA.

Example 33. Preparation of Exemplary Cationic Flocculant Formula

The formula was prepared at 1.4% actives by weight in water (i.e. 14 g polymer per 1000 g), plus 15 ppm preservative, as follows.

A sample of 1000 g formula containing 7 g Coldswell™ 1111, a spray-cooked (pregelled) potato starch provided by KMC (Denmark), in 986 g of distilled water was prepared by quickly stirring in the starch, with continued vigorous stirring for 10 to 15 minutes. Moderate stirring was continued for 1 hour.

To this mixture was added 7 g of cationic PAM (80:20 acrylamide/allyl ethyl triammonium chloride copolymer; Flopam PO 4290 SH; MW approx. 8 million Da) to give a ratio of 1:1 activated starch:PAM. The PAM was mixed in within 30 seconds with vigorous stirring so that it dispersed well before swelling and clumping. Mixing was continued for 10 to 15 minutes with a hand-held mixer. A preservative was added to a final dilution of 15 ppm (1 ml of 1.5% isothiazolinone per 1000 ml of sample).

Example 34. Small Scale Assays of High Temperature Oil-Sands Process Water Clarification Using Cationic Flocculant Formula As described in Example 32, above, a secondary stock at 1/14 dilution was prepared by combining 1 g of the 1.4% cationic flocculant (Example 33) with 13 g water.

Vials containing 10 ml of oil-sands process water were preheated to 95° C. in a forced-air oven. To each vial was added up to 80 µl of 1 $NH_3PO_4$ to bring the pH to ~3.0. To each vial was then added 300 µg of secondary stock solution, to give a dose of 30 ppm actives. The contents were swirled gently, then allowed to flocculate for 1 min. The vials were again swirled gently, to allow the agglomerates to form and rise.

Within a few minutes, the fluids within the vials were substantially clarified, with a clear, lower aqueous layer and a buoyant, floating layer of solids of flocked oily/bituminous material.

Example 35. Small Scale Assays of High Temperature Oil-Sands Process Water Clarification Using Cationic Flocculant Formula (Example 33) in Combination with a Polycationic Coagulant Performance of the cationic PAM/starch flocculant of Example 33 was also assessed in combination with polyEPI/DMA (for example, Floerger FL 3249 or Baker Petrolite BPW 76355) over a range of concentrations of 10 to 100 ppm actives, either separately or at the same time with the cationic, hydrogen-bonding flocculant.

When added separately, the poly Epi/DMA was pipetted into the vial containing the oil-sands process water at a range of doses. The vials were swirled for intervals of 10, 20, 30 seconds and higher. Then the cationic PAM/starch flocculant was added, and the vials were swirled again.

When the poly Epi/DMA treatment was carried out for 30 seconds or more under the conditions tested, then the subsequent addition of the cationic PAM/starch flocculant resulted in the most clarity of the fluid phase observed in the experiments described thus far. In addition, the solids layer was very buoyant, rising quickly to the surface within seconds, in the form of a few large agglomerates. These results were observed at a total dose, for example, of 30 ppm, consisting of 10 ppm poly Epi/DMA and 20 ppm cationic PAM/starch flocculant.

Example 36. Field Tests of High Temperature Oil-Sands Process Water Clarification Using Anionic Flocculant Formula (Example 31)

A sample of 400 ml of freshly collected process water from an oil-sands processing plant was measured into a flask. The temperature of the water was about 90-95° C.

To the water sample was added 1.28 ml of 2N HCl to adjust the pH to ~3.6, as measured by combination electrode. The fluid was swirled manually for a few seconds to allow the anionic phase of the oily/bituminous materials to become neutralized.

After approximately 30-60 seconds, 6 ml of a secondary stock solution (2 mg/ml) of the anionic PAM/starch flocculant formula (Example 31) were added. This amount is equivalent to 12 mg actives in 400 ml, which is 30 mg/liter (30 µg/ml), or 30 ppm.

The fluid was swirled manually for a few seconds to promote mixing and the formation of self-adhering flocs. The sample was then allowed to sit. Within a few minutes, the solution became substantially clear, with a lower layer of flocced oily/bituminous solids.

Example 37. Field Tests of High Temperature Oil-Sands Process Water Clarification Using Cationic Flocculant Formula (Example 33) in Combination with a Polycationic Coagulant Several samples of 400 ml of freshly collected process water from an oil-sands processing plant was measured into respective flasks. The temperature of the water was about 90-95° C.

To each water sample was added 1.28 ml of 2N HCl to adjust the pH to ~3.6 to 3.8. The fluid was swirled manually for about 30 seconds to allow the anionic phase of the oily/bituminous particles to become neutralized.

To each sample was then added an aliquot of poly Epi/DMA from a 5 mg/ml stock solution sufficient to provide a predetermined dose of 1.25 to 30 ppm actives. The samples were then swirled for about 30 seconds, to allow the polycation to adhere to the particulates and tackify them To each flask was then added an aliquot of cationic starch/PAM formulation (Example 33) sufficient to provide a predetermined dose of 1.25 to 30 ppm, or a total of 2.5 to 60 ppm total actives.

The fluid was swirled manually for about 30 seconds to promote mixing and the formation of self-adhering flocs. The samples were then allowed to sit.

Within a few minutes, the solutions became very clear with a faint yellowish tint. The flocs easily and quickly settled out of the solutions. In samples treated with active agents at a total of 5 ppm, 10 ppm, and 20 ppm, the flocs remained stable for several hours at least; at the higher doses, the flocs were stable overnight. At the lowest dose tested, 2.5 ppm, the fluids also clarified substantially, but the flocs were less stable and began to break apart after about 30 minutes at 95° C.

At somewhat lower temperatures, e.g. 80° C. or less, water clarity was more readily achieved and flocs remained stable for longer periods at lower doses, with both the anionic and cationic flocculation formulas (Examples 31 and 33).

Example 38. Separation of Aqueous and Petrochemical Phases of a High-Percentage Solids Downstream Process Water from a Waste Reclamation Stream The waste process fluids used in this example were produced from an oil-sands operation after several steps of conventional separation and water-treatment, resulting in a concentrated residue having a very high level (60% or more oily/bituminous materials) of petrochemical materials emulsified in water. Such waste streams are difficult to clarify even with very high doses of conventional treatment chemicals, e.g. 500 to 1000 ppm actives, which typically produce incompletely separated aqueous and oily layers.

In this example, use of the formulas of the present invention led to rapid and effective separation of the water from the oily/bituminous phases at much lower dosings of chemical additives.

A sample of 400 ml of the oily/bituminous aqueous waste stream described above, having approx. 40% water and 60% petrochemical content, was poured into a flask. To this mixture were added 3.2 ml of 2N HCl, and the flask was swirled and allowed to equilibrate for 30 seconds to 1 minute. A dose of 20 ppm actives of polyEpi/DMA was added, and the flask again was swirled and allowed to equilibrate for 30-60 seconds.

To the resulting mixture was added a dose of 40 ppm actives of the cationic PAM/starch flocculant, e.g. as described in Example 33 above, for a total treatment of 60 ppm actives. The flask was swirled to mix and then allowed to sit.

Within a few minutes, a clear aqueous lower phase began to form, with a dark oily/bituminous phase on top. Within a few more minutes, the lower, clear, aqueous phase had stabilized at approximately 40% of the total volume, with the oily/bituminous phase floating on top.

The invention claimed is:

1. A method of clarifying a process water containing emulsified oil and bituminous particulates obtained from a steam-assisted gravity drainage (SAGD) oil-sands mining operation comprising:
    (a) adding to said process water at a temperature of 85° C. or higher, at least 1 ppm, relative to the volume of said process water, of a polycationic coagulant selected from epichlorohydrin:dimethylamine copolymer (poly-EPI/DMA) and a polymer of diallyl dimethyl ammonium chloride having a molecular weight less than 1 million Daltons and a mole % cationic monomer of at least 50%;
    (b) allowing the added polycationic coagulant to interact with the emulsified oil in the process water for an interval of time sufficient for said coagulant to effect de-emulsification of oily droplets from said process water;
    (c) contacting said process water with at least 1 ppm, relative to the volume of said process water, of a cationic flocculant comprising a cationic acrylamide copolymer having a molecular weight of at least 4 million Daltons and a mole % acrylamide of at least 50%; effective to flocculate said de-emulsified oily droplets and bituminous particulates forming a flocculated solids phase and a clarified aqueous phase, wherein the total of the polycationic coagulant and the cationic flocculant added to the process water is between 2 ppm to 500 ppm relative to the volume of said process water;
    (d) separating the flocculated solids phase from the clarified aqueous phase; and
    (e) recycling the aqueous phase to the steam-assisted gravity drainage (SAGD) oil-sands mining operation.

2. The method of claim 1, wherein the cationic flocculant comprises an acrylamide copolymer which is an acrylamide/allyl trialkyl ammonium copolymer or an acrylamide/diallyl dialkyl ammonium copolymer.

3. The method of claim 1, wherein the cationic flocculant further comprises a heat-activated, pregelatinized or maleamate-modified starch having flocculating activity.

4. The method of claim 3, wherein the cationic flocculant comprises the heat-activated or the pregelatinized starch.

5. The method of claim 1, wherein the process water and added coagulant are stirred and the interval of time is at least 30 seconds.

6. The method of claim 5, wherein the cationic flocculant comprises a heat-activated, pregelatinized or maleamate-modified starch having flocculating activity.

7. The method of claim 6, wherein the cationic flocculant comprises a heat-activated starch which is obtained by heating an aqueous suspension of a starch at a temperature of 70-100° C. or by exposing an aqueous suspension of a starch to steam.

8. The method of claim 1, wherein the cationic acrylamide copolymer has a molecular weight of 12 to 25 million Daltons.

9. The method of claim 1, wherein the cationic acrylamide copolymer has a mole % acrylamide of 70-90%.

10. The method of claim 1, wherein the cationic acrylamide copolymer has a mole % acrylamide of 80-90%.

11. A method of clarifying process water containing emulsified oil and bituminous particulates consisting essentially of:
    (a) obtaining process water from the SAGD oil-sands mining operation, (b) adding a polycationic coagulant to the process water at a temperature of 85° C. or higher, at least 1 ppm relative to the volume of the process water, wherein the polycationic coagulant is a epichlorohydrin:dimethylamine copolymer (polyEPI/DMA) or a polymer of diallyl dimethyl ammonium chloride and either polycationic coagulant has a molecular weight of less than 1 million Daltons and a mole % cationic monomer of at least 50%;

(c) allowing the added polycationic coagulant to interact with the emulsified oil in the process water for an interval of time sufficient for the coagulant to effect de-emulsification of oily droplets from said process water;

(d) contacting said process water with at least 1 ppm, relative to the volume of said process water, of a cationic flocculant comprising a cationic acrylamide copolymer having a molecular weight of at least 4 million Daltons and a mole % acrylamide of at least 50%; effective to flocculate the de-emulsified oily droplets and bituminous particulates forming a flocculated solids phase and a clarified aqueous phase, wherein the total amount of the polycationic coagulant and the cationic flocculant added to the process water is between 2 ppm to 500 ppm relative to the volume of the process water;

(e) separating the flocculated solids phase from the clarified aqueous phase, and (f) recycling the aqueous phase to the steam-assisted gravity drainage (SAGD) oil-sands mining operation.

12. The method of claim 11, wherein the total amount of the polycationic coagulant and the cationic flocculant added to the process water is between 2 ppm to 100 ppm relative to the volume of the process water.

13. A method of clarifying process water containing emulsified oil and bituminous particulates from a steam-assisted gravity drainage (SAGD) oil-sands mining operation, consisting essentially of:

(a) adjusting the pH of the process water to about 2-4, (b) adding to the process water at a temperature of 85° C. or higher, at least 1 ppm relative to the volume of the process water, a polycationic coagulant that is epichlorohydrin:dimethylamine copolymer (polyEPI/DMA) or a polymer of diallyl dimethyl ammonium chloride, wherein the polycationic coagulant has a molecular weight less than 1 million Daltons and a mole % cationic monomer of at least 50%;

(c) allowing the added polycationic coagulant to interact with the emulsified oil in the process water for an interval of time sufficient for the coagulant to effect de-emulsification of oily droplets from said process water;

(d) contacting the process water with at least 1 ppm, relative to the volume of the process water, of a cationic flocculant composition comprising a cationic acrylamide copolymer having a molecular weight of at least 4 million Daltons and a mole % acrylamide of at least 50% and optionally a heat-activated, pregelatinized or maleamate-modified starch having flocculating activity effective to flocculate the de-emulsified oily droplets and bituminous particulates thereby forming a flocculated solids phase and a clarified aqueous phase; wherein the total amount of the polycationic coagulant and the cationic flocculant added to the process water is between 2 ppm to 500 ppm relative to the volume of the process water (e) separating the flocculated solids phase from the clarified aqueous phase; and (f) recycling the aqueous phase to the steam-assisted gravity drainage (SAGD) oil-sands mining operation.

* * * * *